United States Patent
Sephton

[19]

[11] Patent Number: 5,968,312

[45] Date of Patent: Oct. 19, 1999

[54] LIQUID FLOW DISTRIBUTION AND FLOW CONTROL WITH DUAL ADJUSTABLE ORIFICE PLATES OR OVERLAPPING ORIFICES

[76] Inventor: Hugo H. Sephton, Berkeley/Kensington, Kensington, Calif. 94708

[21] Appl. No.: 08/880,250

[22] Filed: Jun. 23, 1997

Related U.S. Application Data

[63] Continuation-in-part of application No. 08/405,170, Mar. 14, 1995, abandoned, which is a continuation-in-part of application No. 07/926,688, Aug. 6, 1992, abandoned.

[51] Int. Cl.⁶ .............................. B01D 1/26; B01D 3/42; C02F 1/06

[52] U.S. Cl. .......................... 159/47.1; 159/2.1; 159/18; 159/27.1; 159/27.3; 159/27.4; 159/43.1; 159/44; 159/47.1; 159/DIG. 8; 159/DIG. 13; 159/DIG. 20; 203/1; 203/2; 203/10; 203/11; 203/DIG. 7; 203/DIG. 17; 203/DIG. 18

[58] Field of Search .......................... 159/47.1, DIG. 16, 159/DIG. 4, 27.3, 27.4, 27.1, 28.6, DIG. 13, 2.1, 18, 43.1, DIG. 8, DIG. 20, 44; 203/1, 88, 11, 91, 10, DIG. 7, DIG. 18, 71, 73; 202/174, 160

[56] References Cited

U.S. PATENT DOCUMENTS

| | | | |
|---|---|---|---|
| 3,403,719 | 10/1968 | Geiringer | 159/26.2 |
| 3,977,935 | 8/1976 | Kowarski | 159/47.1 |
| 4,198,265 | 4/1980 | Johnson | 159/47.1 |
| 4,211,293 | 7/1980 | Blanton | 175/297 |
| 4,292,135 | 9/1981 | Klaren | 202/173 |
| 4,469,130 | 9/1984 | James et al. | 137/606 |
| 4,506,991 | 3/1985 | Hudson | 366/341 |
| 4,511,431 | 4/1985 | Moore et al. | 159/47.1 |
| 4,511,432 | 4/1985 | Sephton | 159/47.1 |
| 4,569,364 | 2/1986 | Keller et al. | 202/158 |
| 5,099,915 | 3/1992 | Van Dyke | |
| 5,156,706 | 10/1992 | Sephton | 159/47.1 |

OTHER PUBLICATIONS

R.P. Hammond et al, "Large Scale Sea–Water Distillation for Southern California", Elsevier Science Publisher, 1992, pp. 69–82.

Snyder et al, "Seawater Desalination Plant for Southern California," Prd. Design Report No. 1084, Los Angeles Ca.10, 1993.

*Primary Examiner*—Virginia Manoharan

[57] ABSTRACT

A method and apparatus for forming an array of multiple parallel flow orifices, for example by holes drilled through a plate in a selected pattern and spacing and of selected sizes or flow diameters, and whereby these orifices are used to provide an approximately equal and adequate distribution of liquid flowing through them as parallel streams of liquid and into an evaporation zone or a parallel array of evaporation channels, and wherein the orifices can be adjusted in flow diameter to control the flowrate of liquid in generally parallel streams with an array of orifice adjusting apparatus, for example an adjacent sliding orifice plate which provides for orifice flow rate adjustment with orifices through this second plate corresponding in position to those of the first orifice plate, and the use of such dual orifice plates for supporting a pool of liquid there-above and for controlling the flowrate of liquid through the first array of orifices by reducing or enlarging their orifice flow diameters to control the level of the liquid in the pool or the pressure of this pool on or at the orifices and controlling the effect-to-effect pressure causing flashdown, and to improve the evaporation process or the degree of evaporation in an adjacent flash evaporation zone or in a bundle of adjacent evaporator tubes, and when applied to a multi-effect series of several such vertical tube evaporators.

25 Claims, 4 Drawing Sheets

LIQUID FLOW DISTRIBUTION AND FLOW CONTROL WITH DUAL ADJUSTABLE ORIFICE PLATES OR OVERLAPPING ORIFICES

This patent application is a CIP of Ser. No. 08/405,170 filed Mar. 14, 1995abandoned, which was a CIP of Ser. No. 07/926,688 filed Aug. 06, 1992 and now abandoned.

BACKGROUND OF THE INVENTION

1. Field of the Invention

The present invention is about a method and apparatus for improvement of vertical tube evaporation (VTE), and particularly, an improved method and means or a system for the distribution of liquid feed with or without solids suspended therein, or wherein liquid feeds are distributed with some vapor as mixed liquid and vapor feed into a plurality of vertical evaporation channels and for liquid flashdown into a plurality of evaporator units operated in series, or in a series of effects, and particularly with the objective of controlling the rates of cascading feed transfer from effect to effect in such a multi-effect (ME) series of downflow evaporators, and to control their effect-to-effect interactions including continuous or adequate feed flow or transfer into all the effects, and to assure continuous and adequate feed flow into all the tubes of such a multi-effect vertical tube evaporator (ME-VTE) in continuous operation, and to improve the overall effectiveness or thermal efficiencies of a series of such evaporator units operated in a multi-effect series, and especially applicable to a vertically stacked, stepped or staggered series of downflow evaporators wherein effect-to-effect feed pumps are not used or not needed. Feed flow is preferably downward in such a series, cascaded or added to an effect or to the next effect by flow subject to gravity.

Conventional vertical tube evaporators (VTE) are usually operated in a series of side-by-side multiple effect (ME) units, wherein the feed liquid is transferred from one effect to the next effect by a pump for the downflow VTE mode and wherein a portion of this pumped feed may be recycled into the top of the same effect to maintain an adequate feed flow there-into. In the upflow VTE mode of ME operation, the feed is transferred by the effect-to-effect static head available, which is at least about equal to the length of such upflow effect VTE tubes, and by means of vapor lifting the liquid through the tubes. Conventionally, heat in the form of steam or vapor and hot liquids, including warm brine, condensates or distillates, are transferred along the series of effects in a manner that improves the amount of product distillate obtainable per amount of heating steam added at the hot end of the ME series, and to drive the evaporation process. Such a multiple effect (ME) VTE series provides for increasing the performance ratio or the economy ratio or the number of pounds of distillate produced per pound of boiler steam applied; and this ratio can be about equal to the number of effects used. In the downflow mode, conventional effect-to-effect feed transfer and flowrate into the top ends of such evaporator tube bundles depend on a feed pump, and the feed distribution into the tubes depends on pump pressure and on nozzles or orifices used. Significant cost advantages can result from replacing the effect pumps by either using the upflow mode of feed flow and feed transfer or by the vertical stacking of the effects and by using the downflow mode as herein applied. In the absence of effect pumps and recycled feed within an effect, inadequate feed flow, dryout of tubes and scaling or hydrodynamic instabilities can affect evaporation performance adversely; this disclosure overcomes or mitigates these problems.

2. Description of the Prior Art References

Downflow and upflow vertical tube foam evaporation (VTFE) was disclosed in U.S. Pat. Nos. 3,846,254 and 4,511,432. Dispersed seeded slurry evaporation (DSSE), also called dispersed slurry evaporation (DSE) was disclosed Ser. No. 07/187,817 filed Apr. 29, 1988 and issued as U.S. Pat. No. 5,156,706.

U.S. Pat. No. 3,846,254 is about vertical tube foamy flow evaporation (VTFE) wherein the thermal efficiency for both the downflow and upflow modes of VTFE operation is substantially increased by imposing a foamy liquid layer flow within the vertical tubes by the addition of selected foaming agents. Single, fixed-orifice plates were used for feed distribution in both modes of operation.

In U.S. Pat. No. 4,511,432 a system for feed distribution into a multiplicity of parallel upflow evaporator tubes was disclosed to improve upflow two-phase flow stability and to improve the performance of such an upflow evaporator. The main objective was to control upflow vapor-liquid stability by means of an orifice plate spaced from the tube bundle inlet ends, and wherein this vertical spacing is adjustable, and is used to prevent oscillating cross flow within this space and amongst the evaporator tubes within an evaporator body or effect. The gap provided between this single orifice plate and the tube inlet ends was reduced to a minimal size to overcome unstable flow in the upflow evaporator tubes. To control this gap adjustment, the tubeside pressure drop was monitored and used as a signal to drive the mechanism for adjusting the gap or the vertical space between the single orifice plate and the tube inlet ends. The vapor-liquid upflow stability was thereby controlled, but not the rate of flow through the orifice plate. This reference is about upflow evaporators mounted side-by-side, and whereby transfer of the feed liquid from one effect to the next is driven by a hydrostatic head which is in direct relationship to the vertical distance between the tube outlet ends of the upstream effect and the tube inlet ends of the downstream effect, or approximately equal to a column of liquid as high as the effect tube length. The spacing or gap between this single orifice plate and the tube inlet ends is variable, and is used to control upflow stability.

In another reference, U.S. Pat. No. 5,156,706, a method and apparatus were disclosed for improving feed distribution with a single orifice plate into a multiplicity of parallel tubes mounted in a downflow evaporator, and the feed is supplied by a feed recycle pump, or is under pump pressure. The feed is distributed through orifices in a single plate and of essentially equal flow diameter, at essentially constant flow rates into the tube inlet ends. All the orifices disclosed are in single plates, all of the plates are fixed except one which is mounted to be vertically movable to adjust the gap or spacing between this plate and the tube inlet ends. Vertical cylindrical attachments to the underside of two plates shown extend into the tubes as feed deflectors, and form an annular area for deflecting the feed onto the tube inner walls for annular flow. In one instance a tubular attachment to the orifice plate and extending into the tube may be tapered and forms a variable annular opening with the tube wall to provide variable annular feed flow rates. The present patent application is a CIP of a CIP of a CIP which copended with Ser. No. 187,817 which issued as U.S. Pat. No. 5,156,706 on Oct. 20, 1992.

RECENT RELATED DEVELOPMENTS IN THIS FIELD

Vertically stacked multiple effect (ME) vertical tube evaporators (VTE) have been proposed for seawater distillation by the downflow mode in 1968 (by R. P. Hammond et. al., in Office of Saline Water R&D Progress Report No. 391, page 132–137), and in 1972 for the upflow mode (by F. C. Standiford, in Office of Saline Water Report No. 517, page 33–35). Since that time, several VTE process and hardware improvements have been reported, including the use of relatively inexpensive aluminum-alloy tubed evaporators, and vertical tubes with thermally effective tube forms having fluted wall geometry's for increasing their steam-side condensation efficiency, and particularly the imposition of two-phase foamy vapor-liquid flow on the brine-side of such fluted evaporator tubes for increasing the overall thermal efficiency of the evaporation process (U.S. Pat. No. 3,846,254).

A recent development which should reduce the cost of evaporator shell construction and provide substantial vessel cost reductions is to use high density concrete casting of vertical cylindrical pressure vessels having reinforced concrete walls.

Another recent and applicable development is the use of mono-molecular surfactants as dispersants to control scaling and fouling in evaporators by applying a novel dispersant effect (U.S. Pat. No. 5,156,706) to increase the on-line availability or the dependability of such facilities.

Some of these developments in combination have been considered in a new study sponsored by the Metropolitan Water District of Southern California (MWD). This study may present a new opportunity for large-scale seawater desalination in conjunction with the operation of coastal power plants which can provide economical turbine extraction steam for such evaporation in a cogeneration mode of power and water production. This may be especially suitable for large coastal cities or for regional water supply; it has been reported in a paper titled "Large-scale sea-water distillation for Southern California" by R. P. Hammond, D. M. Eissenberg, D. K. Emmermann, J. E. Jones Jr. and H. H. Sephton, and published in *Desalination,* 87 (1992) p89–83. Another report from this group titled "Seawater Desalination Plant For Southern California" was distributed by MWD to many organizations and individuals as MWD Preliminary Design Report No. 1084 dated October 1993. In those vertically stacked downflow ME evaporator designs effect-to-effect feed transfer pumps are not needed; seawater feed is pumped once only and into the highest or top effect from which it then cascades downward effect to effect while its volume and flowrate are reduced due to the partial evaporation in each effect along the ME route. This feed reduction can be intentionally varied by a factor of about two to three. Feed distribution into a VTE tube bundle is by a single perforated plate or by nozzles inserted into each tube; feed flows from a feed pool in a pan ranging to about 40 or 48 inches in depth, and at working liquid level or pool depth of about 12–18 inches at full flow; and overflow from the pan is prevented by providing U-trapped bypasses into the next effect.

The present disclosure is about improved feed distribution and flow control from pools of liquid controlled at a depth of about 6 inches and supported above dual orifice plates having novel adjustable-flow orifices that provide for a wide range of flow rate, and for the control of shallow pool depths; and its objectives include the reduction of the facility height and cost, and maintenance of adequate but low feed pressure drop through orifices from feed pools having controlled depths within a narrow range of about 3–9 inches at all expected flowrates. It provides adequate wetting of the tube entrance areas assured by flash-down of feed applied from at least three to six orifices per tube, and the pool or pan levels can be controlled to just about sufficient flow for distribution of adequate feed flows into all tubes of all effects without needing U-trapped feed bypasses or feed overflow prevention devices, while maintaining the concentration factor in the feed to all tubes of all the effects so as to prevent deposition of solutes in the form of scale under all operating conditions, including turn-down, startup and shutdown, to attenuate or control unstable conditions that may occur in such evaporators, and for automation of those process events.

SUMMARY OF THE INVENTION

A method and means are disclosed for distribution and control of feed liquid, or of feed liquid and vapor, with a parallel array of adjustable flow apertures or orifices or flow control gates formed by the horizontal alignment of a first array of orifices spaced in parallel through a plate and, adjacent thereto an array of slideably mounted gates or orifice adjustment means or a second array of corresponding orifices adjacent to and slideably mounted over the first array for the control of liquid flow in parallel streams; and it includes other similar flow gate means for the adjustment or modification of such flow diameters and the rates of liquid flow directed into a liquid flashdown zone to cool it down by reducing the pressure thereon, and into an evaporation channel or a plurality of parallel channels for further liquid evaporation, including the distribution by flashdown of liquid feed onto the inner walls of evaporation channels or tubes for further evaporation of the liquid by vertical tube evaporation (VTE) with steam or vapor heating, and wherein the objectives include improvement of the evaporation rate or its thermal efficiency by using this adjustable dual orifice means for control or adjustment of the feed flowrate; and further including feed flow stability improvement, and the control of feed liquid levels in pools thereof supported by these dual orifice plates, and also to control cascading liquid flows from one evaporator effect or stage into an adjacent evaporator effect or stage in series operation, and to improve the capital or operating cost and the thermal efficiency or the reliability of a multi-effect or a multi-stage series of vertically stacked evaporators, especially for evaporation of seawater feed for its desalination in large facilities. This procedure provides for a wide range of liquid flow rates imposed under a narrow range of applied liquid levels or pressures or alternatively, to provide for reduced liquid levels or liquid pressures controlled with a wide a range of liquid flows imposed as compared to the prior art.

To achieve these objectives, a method and means are disclosed for controlling the rate of flow of feed liquid distributed into a downflow flash evaporation zone or channel, or for liquid flashdown from a warmer to a colder temperature, and also for feed distribution with or without flashdown into an evaporator comprising a bundle of multiple parallel evaporator tubes, with the objectives of controlling or equalizing and maintaining feed flow into such zones or tubes or to control the degree of evaporation of a liquid feed, or to control its salinity and to prevent solute precipitation, scaling or fouling, and also to maintain a selected or adequate liquid level in a pool of liquid above the adjustable dual orifice plates to assure adequate residual feed levels for the continuous distribution of liquid into the flashdown zones or into a multiplicity of evaporator tubes of several VTE effects operated in series. The feed control means may comprise two sets of coinciding orifices in parallel, formed through two adjacent orifice plates to provide adjustable orifices by a sliding translation of one plate over the other plate and for controlling or distributing the feed there-through and into the evaporation zones or into each of the tubes of the VTE tube bundles; or to automatically control feed flowrates by causing the orifice plates to slide or translate responsive to process data including a signal from a feed level float or sensor and in response thereto activate or control the adjustable dual orifice plate assembly to maintain a selected feed level or level range, and to also assure continuous and adequate feed flowrates into a series of effects. A further objective is to detect, reduce or eliminate surging flows or flow instabilities between a series of multiple evaporator effects or stages. Provision is also made for sensing, determining, measuring, monitoring and recording feed liquid levels or feed pool depths, or effect vapor pressures or liquid pressures or temperatures, or liquid salinities or flow rates that may indicate or cause surges or instabilities or fouling or scaling of equipment surfaces and to control any of them, and also for reducing or baffling surging flow events with objectives of increasing or maximizing the evaporation rates and heat transfer efficiencies; and also the use of these data to actuate servo-mechanisms or to apply a force or pressure to operate the sliding orifice plate over an adjacent or fixed orifice plate and control the flow diameters of the orifices formed through both plates, and for forming orifices of variable flow diameter by moving or sliding one plate over the other; and by using any suitable means including a mechanical lever or hand power or an electric driver, any hydraulic or pneumatic piston or motor actuation, or a rack and pinion gear mechanism or worm gear mechanism to cause the plates to translate or slide over, or adjacent to one another, and to reduce or adjust the flow diameter of these orifices responsive to a signal or data from any suitable process aspect by sensing or measuring any variable aspect of the evaporation process useful for this purpose, and to apply these means to improve the evaporation process or any aspect thereof.

OBJECTIVES OF USING DUAL ADJUSTABLE ORIFICE PLATES WITH REFERENCE TO THE PRIOR ART

One objective of this invention is to control parallel streams of liquid downflow within an increased range of flowrate which is selected and may amount typically to about a 5-fold range of flowrates imposed under a range of static liquid pressures of about 3 to 9 inches of liquid level in the liquid pool above the orifice plates.

In the present disclosure horizontal double or dual orifice plates may be used, and either the feed flow rate per orifice or the effect static head or feed pressure on the plate or the feed level above the plate may be used to control the feed flow rate by adjusting the flow diameters of these orifices. Another objective is to adjust or maintain the liquid pressure or feed level at or above its lowest effective level of only a few inches or about 6 inches and which may range from about 3 to about 9 inches of liquid, to thereby reduce the effect height by about 24 inches or more, and to adjust orifice flow diameters to maintain continuous feed flow and its flashdown even under low and variable effect pressures to maintain continuous and adequate cascading feed flows through all effect feed orifices. Another objective of this disclosure is to provide improvements which permit stable downflow operation for ME-VTE, ME-VTFE or ME-DSSE and ME-HTE (horizontal tube evaporation) processes or facilities, even when such facilities are substantially turned-down, or to improve the startup or shutdown phases thereof. Improvements depend on the design disclosed herein which provides for adjusted orifice diameters ranging from substantially larger to smaller than the state of the art orifices or the design point orifices for single orifice plates or nozzle inserts into the VTE tubes.

The design point flow orifice sizes for the prior art are defined and fixed for each effect to assure adequate feed flow effect-to-effect when operating at the design capacity in steady-state operation and with adequate feed flow into the first (top) effect for continuous feed flow and non-saturated liquid salinity through all effects, and wherein the feed flow through all effects would vary and be subject to a wide range of feed liquid levels, and ranges from a minimal inch or two to about 40 inches during the startup and shutdown phases. The dual orifice plate system of this invention automatically maintains a selected and lower liquid level or a lower range during all operating phases by adjusting orifice feed flow rates by orifice size variation rather than by liquid level variation as in the prior art. The actual individual orifice pair sizes would provide for more than the maximum effect feed flows anticipated, and without using bypass flow devices. When fully open, the adjustable orifices of this disclosure may for example permit up to about 400% of the prior art design-point flowrate as needed in the lower effects, e.g., during startup or shutdown phases, but prevents feed pool levels exceeding about 9 inches and obviates the prior art need for feed overflow devices to bypass feed to the next effect. To reduce the feed pool level below a selected high level such as 9 inches this invention increases the rate of liquid flow into an effect; also, during periods of low productivity needs this invention can for example maintain continuous feed flow into all the effect evaporation channels or tubes even at or below about a 50% reduction of the prior art design point flow for each effect, e.g., at about a low selected feed pool level such as 3 inches, or as may be needed at such times. For example, this control system would permit stable VTE facility operation even during a 50% reduction in capacity or in first effect steam flow and in feed flow below the prior art design point capacities, and with correspondingly lower coolant flow during such a turndown requirement or to facilitate smooth startup and shutdown phases of this facility at a gradual, controlled pace, and even during quick shutdowns responsive to emergencies. This represents about a 5-fold range increase over the flow range of the prior art fixed-size orifices, provided at lower orifice pressures with liquid levels of 6 to 9 inches; it improves process stability's and significant material and cost savings. This invention eliminates the need for a multiplicity of liquid bypasses at each effect level of the prior art, and it permits an extended range of distillate production rates or plant operating capacities.

The present disclosure is distinguished from each of the references in several respects, including their objectives, and by providing new methods and means for cascading feed flow control and distribution, and by providing an extended range of feed flows under reduced and selected feed level ranges, and to provide and ensure minimal but adequate feed flows under minimal static heads of cascading feed, and to limit the overall facility height for ME stacked downflow VTE facilities by about 2 feet per effect, and to save on both their capital cost and feed pumping cost. These dual orifice plates and their translatable or slideable mounting provide for variable sized orifices or flow diameters of a wide range for the control of cascading feed flow rates of several-fold flow variation between upper and lower effects of a ME stacked series of effects, with orifices which are self cleaning, of dependable simplicity and capable of providing for liquid level control, for liquid and vapor pressure controls, and for a control system which responds to various process data sensed by several types of sensors including liquid level sensors, pressure sensors and salinity sensors, all of which may be used for causing the flow orifices to be modified or adjusted for process control, including controls to provide variable and adequate continuous feed flows, feed salinity and fouling or scaling control. This control system for automatic feed flow adjustment from effect to effect can also control surges or harmful flow dynamics from effect to effect; and it allows for data display, data recording and process automation.

Another objective of the dual orifice plate is to control the VTE feed concentration factors, feed levels and feed flows, and to respond to the concerns of scaling and fouling, and to reduce capital costs by reducing the level of feed maintained in each VTE effect to about the minimum level needed to flood the orifices and to maintain flow through all of them, and to thereby reduce the overall height of the ME-VTE series of effects and the capital cost and pumping cost for the entire facility. Feed flow rate control and its flexibility are made possible with the variable orifice plates of this disclosure by the large range of orifice sizes rapidly and uniformly imposed for variable flow control at adequate rates even with low inter-effect static heads that can be automatically maintained with this orifice system.

Figure 3:
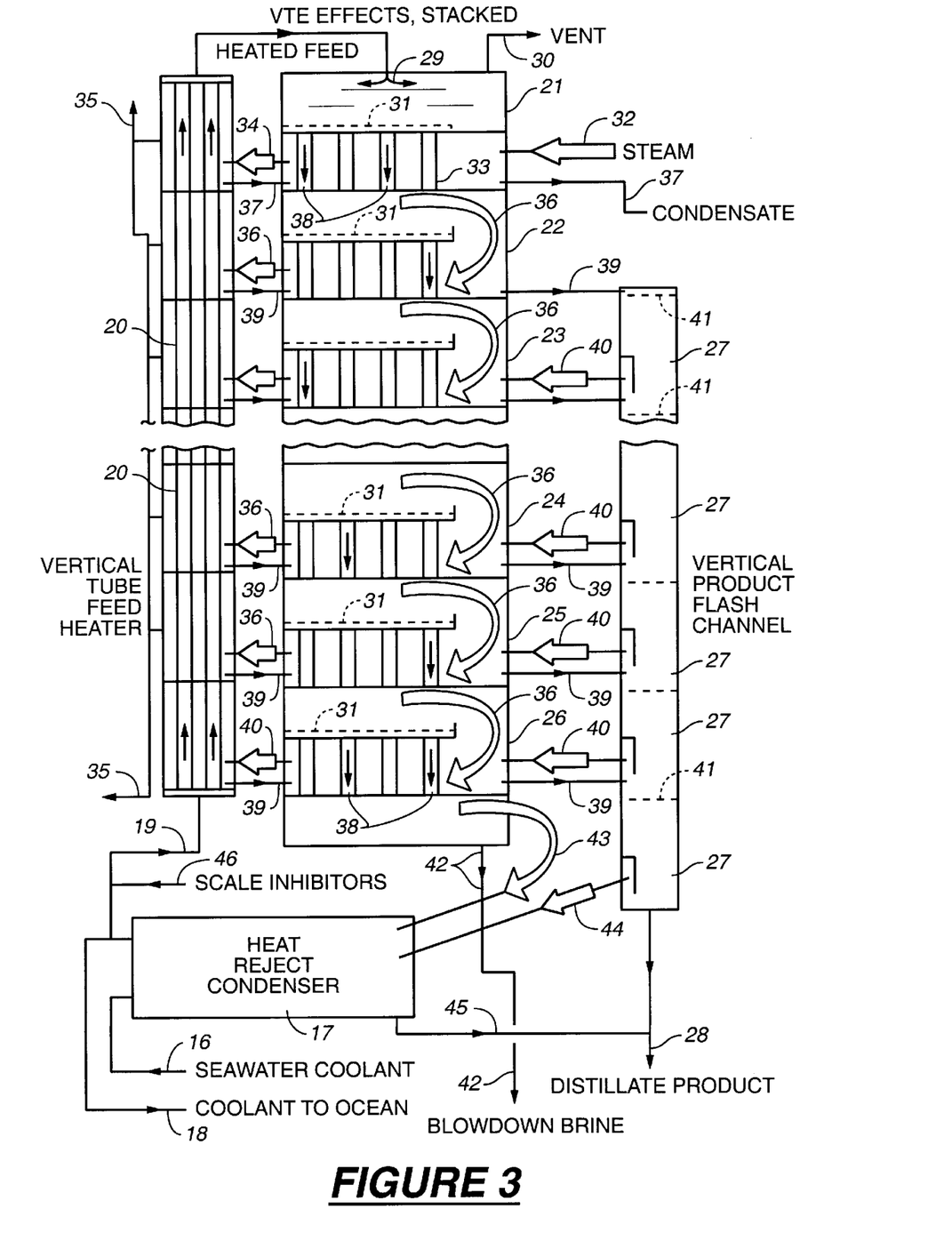
FIG. 3 represents a simplified process flow diagram for a vertically stacked multi-effect downflow evaporation facility.

Other objectives of this disclosure are to assure adequate and fairly even cascading feed flows distributed to all flashdown zones for cooling-down of distillates and for feed liquids into all the VTE tubes in any effect, and to also control the continuous feed flows into all effects or stages at all operating times such as at startup, steady state or shutdown, and to also control proper feed salinities throughout the following series of events associated with the startup and warmup phase, and the cool-down and shutdown phase as well as the main steady-state operating phase of a multi-effect series of stacked downflow vertical tube evaporators (ME-VTE) represented by the process flow diagram of FIG. 3. It will also permit stable operation at turned-down capacity and at a turned-up capacity, to allow for a variable distillate production capacities.

Prior art single orifice plates known are designed to distribute feed at essentially constant flow rates and under essentially constant and relatively high effect-to-effect pumped or static pressures, including those disclosed in U.S. Pat. Nos. 3,846,254, 4,511,432 and 5,156,706 which cannot achieve the objectives of this disclosure. If such single orifice plates were applied in vertically stacked ME-VTE facilities the stack would need to be higher than comparable facilities of the present disclosure to permit the liquid layer above those plates to rise and fall by up to several feet in level or height to provide the orifice pressures needed to provide the variations in feed flows needed to maintain continuous and adequate feed flow through all the effects with such fixed orifices, and to control the salinity in residual feeds during all typical, and startup or shutdown conditions of operation of the ME-VTE. In addition, liquid bypass flow or overflow conduits such as U-tubed or U-trapped bypass means or float valves required to bypass feed around effects in the prior art are replaced by this invention.

FURTHER OBJECTIVES OF THE ADJUSTABLE DUAL ORIFICE PLATE, OR USES OF VARIABLE OVERLAPPING ORIFICES FOR FLOW CONTROL

The objectives of this split-orifice or dual orifice device include accommodation of the total liquid or feed flow (no effect bypass flow is needed), and adequate feed flow control and scale control for all VTE effects as well as vertical flashdown control of the liquid feeds passing one effect into the next effect while flashing down with the production of vapors as their temperatures are reduced towards those of the liquid feeds in the next effect. Similarly, the adjustable orifice controlling device of this disclosure is also applied for the control of flashdown and cooling down (flashdown cool-down) of the product distillates produced to permit recovery of heat for recycle as also later shown. The objectives of this disclosure are to achieve results beyond those of the known references or a combination of them.

In addition to control of variable feed flows that occur from effect to effect through the ME series during the startup and the shutdown phases of evaporator operation as well as the steady-state phase of operation, the variable feed flow control method disclosed herein is applicable to control of transitional flow variations and to counteract unstable events during the steady-state operation phase of a ME-VTE or deviations from design point operations for such facilities, including the following:

About two-thirds to three-quarters of seawater feed may be vaporized during the steady-state distillate production phase, but virtually all the feed is passed through all the effects in series at the initiation of the startup phase and at the termination of the shutdown phase while reduced evaporation occurs progressively during these phases. Thus the feed flows to be controlled would vary widely between those transitional phases and the typical steady-state production phase. During the main operation phase for production at the design capacity, the feed flow per effect and per tube for the first (highest temperature) effect would be about two to three times the feed flow per effect and per tube of the final (lowest temperature) effect. All the feed may be preheated to the top feed temperature and enter the first effect, or only a part of it may be applied this way while less heated feed streams are split off into lower effects to supplement the volume of feed remaining after partial evaporation of the portion of feed heated to the top effect temperature. Another option is to divide the ME facility into several stacks having fewer effects than those spanning the entire temperature range. This versatile feed control system would cope with all such feed options or needs in large plants, and for all operating conditions and to prevent dryout or scale deposition in the evaporator tubes of all the effects in such series operations.

In downflow VTE, the tubes are drained by gravity, and they must not be permitted to run out of feed while heat is applied or salt precipitation or scaling will occur in time. The objectives of this disclosure include to provide a system and apparatus to maintain steady or controlled effect feed levels, and to improve feed distribution to provide adequate feed flow to all evaporator tubes under all phases of operation to ensure that fouling or scaling of the tubes do not occur as discussed below, and to improve, optimize or maximize distillate productivity rates. As an additional objective, detrimental surging effects and unstable flow from effect to effect that may occur even during steady-state operation can be reduced or controlled by this invention. In the downflow stacked series, effect-to-effect feed transfer occurs subject to hydrostatic pressure or liquid pressure due to gravity in combination with the thermal or vapor pressure differences existing effect to effect at their orifices. Also, there is some but not much post-orifice tubeside pressure drop to dampen or impede flow through downflow VTE tubes. If these orifice sizes are adjusted responsive to hydrostatic pressure change at the orifices only, a sudden pressure rise in an effect could send a surge of increased flow downward into lower effects, or cause a pressure wave or a surge effect-to-effect.

However, if the orifice sizes are controlled responsive to liquid level measurements only, the surge would be reduced or muted. In this disclosure, orifice sizes may be controlled to increase responsive to an increase in feed liquid pool levels sensed or measured above the orifice plates or the orifice flow apertures may be reduced responsive to reduced feed liquid levels sensed above the plate, and to mute flow instabilities.

An additional improvement is provided by supplying each evaporator tube with feed from typically 3 to 6 adjacent orifices, and also with feed splashed from several nearby orifices, while conventional tube-inserted distribution devices for feed flow control have 1 or 2 orifices per tube only. Obstruction or plugging of even one of the latter two orifices tends to cause serious fouling or scaling of such tubes while the multiplicity of adjacent and peripheral tube orifices of this invention minimizes this concern substantially, or eliminates it.

A further objective of this invention is to provide a system for effect-to-effect flow control that can react intelligently or predictably to pressure and level sensors on a basis of previously recorded data on such events, and to then react by changing the flow diameters of the orifices in each effect to dampen or reduce or depress or mute any surge which adversely affects evaporation performance over a series of evaporator effects. For instance, with two pressure sensors, for example piezo-electric sensors, one located in the vapor space above the liquid layer or a vapor pressure sensor and one at the liquid pool bottom level or a hydrostatic pressure sensor, their data could be used to distinguish whether a sudden static pressure increase on an orifice plate is due to a feed flow increase or to a vapor flow increase or a temperature and vapor pressure increase in the effect above; and to essentially maintain the existing orifice flow diameter if the pressure excursion was due to an increase in vapor pressure to thereby reduce an instability and to maximize the efficiency of the multi-effect evaporator series. Thus the split-orifice device of this disclosure has the objectives of both maintaining an adequate and minimal liquid level upstream of all the effect orifices for continuous feed flow to all tubes, and to react intelligently to any excursion from the process steady state by reference to previously recorded data and to reduce, attenuate or minimize or control its adverse effects. Such excursions or surges, characterized by unusual changes occurring in the vapor pressure and temperature are to be anticipated but are not yet well-defined; operating experience with such systems is needed for this purpose and would provide typical data on cause and effect relationships for this process, and which may be stored and utilized in a computer or a programmable logic controller (PLC) to control such surges or excursions and flow instabilities and control them automatically.

Large ME-VTE facilities are likely to be coupled with coastal power plants in a cogeneration mode, requiring steady ME-VTE operation over months, continuously without interruption. On a basis of experience, orifice control may be applied based on a ranking in significance of the various data from level, flowrate, temperature or pressure probes and other process observations.

In stacked downflow multi-effect, evaporator feed transfer depends mainly upon total effect-to-effect pressure differences due to the liquid level maintained above the orifice plate (static head) in each effect, the gravity force, plus the vapor pressure difference (delta-P) due to the temperature differences effect-to-effect. This thermal or vapor pressure difference at startup and at shutdown is essentially zero and it is predictable during stable steady state operation but it changes during the periods of gradual startup and shutdown phases. To prevent tube drying or scaling, a dependable feed control system which can maintain adequate and continuous feed flow through all the tubes under all these conditions is vital to improve the evaporator performance. A major objective of this disclosure is to provide such means and a system for its application, and to improve the dependability and continuous operating availability of such large multi-effect (ME) downflow evaporators of the VTE, VTFE, DSSE and HTE types with improved efficiency, and also to provide an automatic operating system and a record of facility operation events to provide a data base and a responsive control mechanism.

In vertical tube evaporation (VTE), vertical tube foam evaporation (VTFE) and dispersed seeded slurry evaporation (DSSE), and especially in multiple effect (ME) vertically stacked VTE and VTFE or DSSE, the control of feed distribution is of critical importance to prevent scaling or precipitation of salts or scale or foulant layers inside the tubes. Inadequate and unequal feed flow distribution could occur in the lower effects of a ME stacked series of effects if the feed flow-rate into the top effect or first effect is too low, so that insufficient feed remains towards the end of the ME series of effects. To offset the diminishing liquid availability, the feed into the upper effects may be increased above the minimal adequate flow needed, to assure a sufficient residual feed flow for the lower effects. The reduced flow of feed from higher effects into lower effects and its distribution to all tubes are improved by using the feed orifices disclosed herein having adjustable sizes wherein their flow diameters are automatically adjusted to maintain variable but continuous flows through all such orifices in all the effects and to maintain selected feed levels above the orifice plate of each effect. This method of automatic feed flow control responds to process aspects sensed or measured for data at selected points including variations in the temperature and pressure differences effect to effect along the ME series, and the changes in the salinity and flow rate of the feed stream through the multi-effect series. This process can also control split feed modes whereby additional feed is injected to replenish feed to an intermediate effect in the ME series to maintain adequate feed levels and flows to all effect tubes and to prevent their fouling or scaling.

At startup, and during the initial warming-up phase when little or no evaporation occurs, the feed flow through the effect tubes are essentially constant and may range from about 2 to 4 gallons per minute per tube of 2-inch diameter, and initially the hydrostatic pressure between effects are essentially equal at equal liquid pool levels above the feed distributors. This would require essentially equal effective orifice sizes or flow diameters through the series of effects at startup and upon shutdown if there are an equal or nearly equal number of tubes per effect. However, at the typical steady-state evaporation condition or at the design operating capacity, the required feed flow rates per effect are not equal and the effect-to-effect vapor pressure differences are also not equal. These unequal effect-to-effect process conditions are required or imposed by characteristics of the multi-effect process including the effect vapor pressures, the chemistry and fouling/scaling tendencies of the feed waters, including seawater, brackish water, cooling tower blowdown, agricultural drainage water and other saline waters which contain calcium and magnesium salts that have a reduced solubility at higher temperatures, as well as the usual sodium and potassium salts in higher concentrations, and wherein these salts include chlorides, carbonates and sulfates. Process constraints imposed on ME-VTE procedures are known from the literature data for desalination of brackish water and seawater, in part as follows:

Data on the solubility limits for calcium sulfate in the literature define the seawater brine concentration factor permitted during ME evaporation as a function of the evaporation temperature and to avoid calcium sulfate precipitation as its anhydride, its dihydrate (gypsum) and its hemihydrate forms (See e.g., The U.S.A.I.D Desalination Manual, 1981, Figure 3–25). A graphic based on those data and also showing as a dashed line a concentration profile for 3-fold evaporation of seawater by MEVTE that would prevent calcium sulfate precipitation is shown on page H-5 of the above MWD Report No. 1084 [Copy submitted earlier to the Patent Office]. Those data require the use of relatively higher feed flow rates for higher effects than for lower effects, and to ensure that adequate residual feed flow rates can be maintained for each tube in the lower effects wherein the residual feed brines have increased salt or solute concentrations at these lower effect temperatures downstream in a VTE effect series and to prevent the precipitation or deposition of scale or foulants. Since the available residual feed flow per effect may be reduced by a factor of about 2 to 3 while effect-to-effect pressure differences (Delta-P or $\Delta P$) due to the effect-to-effect temperature differences (Delta-T or $\Delta T$) may be reduced about 7-fold from the highest to the lowest effects during typical operation of the ME series, the orifice flow diameters must be correspondingly adjusted to maintain adequate effect liquid levels and flows through all of the effect tubes and to prevent scaling due to precipitation or dry-out or dry spotting in the tubes. The adjustable orifices of this invention provides for this flow variation, and a control procedure and for this system. The flow diameter of the orifices in each effect are thus controlled automatically for sufficient flow and feed distributed into all the effect tubes in each effect in series, provided that the initial feed flowrate into the top effect is also adequate. It provides for the automatic adjustment of all the orifices in each effect, to adjust to flow requirements for the cold start-up and shut-down conditions and also for typical steady-state distillate production conditions, and to alleviate or terminate surges or flow instabilities that may arise between effects, and to maintain the ME series properly tuned for maximal productivity rates. Data or measurements needed for automatic orifice size adjustment include the effect liquid levels, the effect static pressures above the effect orifice plates, the steam flow rate and its temperature and effect vapor pressures or temperatures, the effect brine flow rates, salinities and temperatures, and the feed flow rate into the first or topmost effect which has to be controlled and adequate; or at least some of the data are needed.

Typically, a multiple effect (ME) series of evaporators is designed to utilize about an equal amount of heat per effect which is re-used repeatedly at stepwise-reduced temperatures effect after effect to evaporate about an equal unit of feed or liquid within each of these effects in series. And only the first effect receives steam from a boiler or a turbine, and this heat energy is repeatedly re-used at lower and lower temperature levels in the series of effects, whereby steam condensing in the first effect generates vapor from the liquid being evaporated and this vapor condenses in the next effect to serve as steam for evaporating more liquid in that effect, and so on along the ME series. Condensates are collected from the condensing vapors produced in each effect to form the distillate products which accumulate along the series of effects, and these products are flashed down effect-to-effect, generating somewhat more vapor to evaporate brine in lower effects. The condensate thus gained per unit of boiler steam applied to the first effect is about in proportion to the number of effects used in a ME series. These increasing rates of condensate or distillate flows need to be cooled down from each effect into the next effect with controlled flashdown to generate or release the vapor equivalent of each pressure drop on this increasing stream of distillates. This requires a series of flashdown devices and liquid level control. In the prior art liquid-filled U-tubes or U-traps used can maintain an upstream liquid level or static pressure while permitting flow with flashing overflow from the downstream leg of the U-tubes. The controlled, adjustable orifice plate of this disclosure is herein applied to replace and improve on such flashdown overflow devices of the prior art, and to improve the capacity, dependability and thermal efficiency and cost of the evaporation process for large plants.

The chemistry of the feed brine or the concentration factor of the effect feeds need to be controlled to prevent scale formation and to minimize fouling. Several methods are known, including pH control by the addition of acid followed by removal of carbon dioxide by deaeration to prevent the relatively soft alkaline scales from forming, including calcium carbonate, magnesium hydroxide and calcium phosphate. Other agents applied to hinder or prevent alkaline scale include polyphosphates, polymers or poly-electrolytes or organic polymeric dispersants. In addition to alkaline scales, formation of the relatively hard scales of calcium sulfate (anhydrite), its hemihydrate form and its dihydrate form (gypsum) need to be prevented from depositing on heat transfer surfaces by maintaining non-saturation of those three calcium sulfate forms in the brine. The recent DSSE method of adding a selected monomeric sulfonic acid type of surfactant-dispersant for scaling and fouling inhibition by dispersion effects, and for rapid descaling by a freshwater wash to redisperse the scale and foulants have been disclosed in U.S. Pat. No. 5,156,706. Known as dispersed slurry evaporation (DSE) or dispersed seeded slurry evaporation (DSSE), this scale control method improves evaporation performance with the present disclosure as follows. Conventionally, calcium sulfate scaling is prevented in ME distillation processes designed for seawater feed by having evaporation occur only within the known limits of the feed concentration factor and evaporation temperature shown in the above referenced literature data. The concentration limits of seawater brines are therein stated as a function of temperature within which the precipitation of calcium sulfate and its hydrates are avoided. Strict adherence to these constraints should prevent that the brine reaches saturation with respect to calcium sulfate during its passage through all the effects in a ME series. In real life, scaling and fouling do however occur in time, sometimes due to unknown causes or local effects or transient insufficient feed flows. The use of DSSE scale control additives is economically justified and adds to our confidence in evaporator on-line availability; this confidence has a high value for power and water cogeneration, achievable with this procedure.

To maintain the brine concentration within non-scaling limits through the temperature range for all effects in a ME evaporator series, an adequate residual brine feed flow must be maintained through all effects to maintain a non-saturated concentration of salts in the brines in all effects. Maintenance of the required residual feed pool levels and flowrates in each effect by using the variable flow capability of the dual orifice or split orifice plate of this disclosure is intended to cope automatically with this requirement provided the first effect feed flowrate is also adequate. The feed rate into the first effect and the subsequent evaporation rates in each effect may be monitored, or the brine salinity or conductivity in each effect may be monitored to determine whether those limits are adhered to through the effect series. This information may then be used to adjust the overall feed flowrate into the first effect which affects feed flowrates into all lower effects, and to adjust or reduce the brine concentration profile through the ME series by reducing either the steam flowrate applied or its temperature, or the coolant flowrate applied, while an opposite effect on the concentration line may be obtained by increasing the heating or cooling rates, or by a reduced feed flowrate into the first effect. The objectives of this invention include controlled rates of feed flow into all the evaporation zones or channels of a ME series of evaporators to improve the evaporation process, and to adjust or maintain adequate flow throughout the ME series automatically; and also to prevent precipitation of solutes from the liquids, to prevent dry tube surfaces, and to improve and maintain evaporative heat transfer efficiency and improve the performance and availability of a ME evaporator series.

Another objective of this invention is to control or maintain an adequate level of the feed liquid pool of each effect, or selected maximal and minimal levels thereof. One such control system relies on providing a pressurized hydraulic line in each evaporator or effect, connected via a three-way valve with lines to a hydraulic motor for driving the movable orifice plate upon actuation by any pool level sensor (e.g. one of the float type) and to increase the orifice diameters if the pool level increases towards the maximal level selected or to reduce the orifice flow diameters if the level falls towards the minimal level selected.

Another objective of this invention is to reduce the level of the feed and the weight of liquid in each effect, and to maintain it close to minimal needed levels and to thereby reduce the overall height (size) and cost of the evaporators and various conduits or piping, and to reduce support structure materials and silo or vessel height and their capital costs, and to also reduce the feed pumping costs. Lower feed pool levels reduce the liquid weight for each effect and provide significant cost reductions of evaporator support structures and foundation. This objective is important for reducing capital and pumping costs for large seawater desalination plants and the cost of the product water.

A further objective of this invention is to provide a mechanism for the orifices to be readily self-cleaned by occasionally causing the slideable or translatable plate, or another type of gate to move rapidly back and forth over the full range of sliding travel (by reciprocation), and to dislodge or cut by scissors-like action near each end of its translation any seaweed remnants or particulate or orifice foulants or orifice obstructions or debris that may impede or obstruct feed flow. As a further improvement of this self cleaning method, an additional fixed orifice plate having, e.g., orifices corresponding with those of the first or primary orifice plate may be installed above and in touch with the sliding orifice plate so as to improve the cutting or dislodging action on orifice fouling materials. Other improvements may result from sliding knife edges or from laying stationary netting material or a grate or lattice over the sliding orifice plate. This periodic cleaning of each effect orifice plate in a ME series may be automatically timed, or may be manually triggered from a central control panel.

Another objective of this invention is to provide feed flow orifices that will cause and maintain flashdown of the feed as it passes through the orifices under the effect-to-effect pressure drop thereby also maintained, and to cause or maintain wetting of all inlet end surfaces by splashing impingement onto the tube sheet and the tube upper ends, to initiate or enhance foaminess in the feed and to initiate annular foamy vapor-liquid flow into the evaporation tubes, and for imposing flow as continuous annular two-phase vapor-liquid foamy layers of flow directed over the tube inner surfaces, and for keeping all tubeside surfaces wet and to enhance the thermal efficiency of evaporation.

Another objective of this invention is to assure that all equipment surfaces below each of the orifice plates are maintained wet and well flushed with feed liquid at all times, to prevent precipitation or fouling or scaling on these surfaces during evaporator operation. This may be accomplished by providing at least three, and up to about six adjacent feed streams impinging onto the tube sheet at positions surrounding each of the evaporator tubes and having a suitable continuous open space above the tube sheet by mounting the orifice plate a short distance above the tube sheet, usually about two inches but generally in the range of a quarter inch to six inches. An objective is to ensure that splashing feed impinging onto the tube sheet is spread about, and to constantly or continuously renew the surface liquids over all tube sheet surfaces and tube inner surfaces near the inlet ends of the tubes sealed through the tube sheets to assure that all tube inside surfaces and tube sheet and lower plate surfaces are continuously flooded or washed with the feed liquid during all conditions of operation.

A further objective of this invention is to provide for drainage of liquid from the series of evaporators after its intended shutdown or after a brief freshwater wash-down prior to shutting the evaporator down for occasional plant outages.

Another objective of this invention is to provide flow control of product or distillate and its cooling down by flashdown effect-to-effect, by providing horizontal dual inter-effect orifice plates of the adjustable orifice type to maintain and control effect-to-effect pressure differences to cause and improve the flashdown efficiency, and to control the distillate levels or pools above these plates or the pressure that these pools exert on these plates and support structures, and to control distillate streams of gradually increased volume and rate of flow effect-to-effect accumulated down the series of effects.

Another objective of this invention is to provide means for the sensing of effect liquid levels above the orifice plates, including liquid static pressures and vapor or thermal pressures, and of liquid flow rates, temperatures and salinities, and to monitor these data to develop means for anticipating or detecting process instabilities, surges in flow or operational problems that may lead to fouling or scale formation or a reduction of thermal efficiencies or productivity rates, and to prevent or eliminate or control deleterious events, and to provide a basis for control of the entire multi-effect series of evaporators so as to maximize continuous on-line availability and productivity rates. This may be accomplished by feeding all these and other process data into a computer or microprocessor where the data may be assessed, stored and utilized to trigger or cause the orifice plates of various effects to be adjusted automatically for the purpose of maximizing the evaporator efficiency, scale prevention and on-line availability, or to apply the orifice self-cleaning effect. All available process data and information may also be fed to a control panel for the display and storage thereof for immediate or later access by operator personnel. One example for instance is to show a continuous feed liquid level video display for all VTE effects and product or distillate flashdown stages, to facilitate operator control. These data may also be applied to trigger automatic orifice plate adjustments, and high and low alarm signals for personnel attention to maintain the evaporator at improved productivity rates and to facilitate its operation.

In its preferred embodiment, this invention is about the use of variable orifices or orifice diameters or stream flow sizes, or of adjustable orifices to regulate or control the rates of liquid flow or liquid and vapor flow, or vapor, liquid and precipitated solid flows through a parallel array of such orifices by manipulating or adjusting the flow diameter or size of such orifices to maintain various continuous flow rates of liquids or liquid and vapor throughout the series of effects, or to maintain liquid pools within predetermined level or depth ranges through the series of effects, and to provide these controls manually or automatically and continuously.

The split orifice plate or dual orifice plate of this disclosure comprises a first or fixed orifice plate spaced from and parallel to the inlet ends of an array of flow channels, and having orifices at selected positions with reference to the flow channels downstream thereof and of a selected and about uniform size or diameter drilled or punched through this plate, and a second plate being slideably or moveably mounted in parallel adjacent to or against the first or fixed plate and having orifices either concentric with or able to coincide or overlap with those of the first plate and of about the same or larger or smaller size or diameter than the first plate orifices, and of about the same or a different shape than those orifices through the first plate to allow for a range of adjustment of the jets of feed or liquid passed through this adjustable-orifice device.

As an alternative to one fixed and one sliding orifice plate, different assemblies comprising slideably oriented orifices may be provided and still fall within the scope of this disclosure, for instance both plates may slide or move so as to keep the location of the combined orifice or the dynamic orifice or actual stream or jet in place or to maintain the location of impingement of the stream or jet of feed onto a tube sheet and to vary only or mainly its size and flow diameter or flow volume or flow rate. In addition, these adjustable orifices may be formed by other means and still be within the scope of this disclosure, for instance by other flow gates comprising a fixed orifice plate and an array of parallel flat strips moved over it to change the fixed plate orifices or flow paths or diameters or dimensions, or a web of such metal plates for instance formed from metal plate by punching out orifices including rounded or oval or rectangular shapes of material in those areas where orifices are to be formed for adjusting the flow orifices of a fixed plate. The orifices through the second plate may differ in shape, diameter or form from those of the first plate; for instance the second plate orifices may be elliptical rather than circular, with a minimal diameter about the same as the diameter of circular first plate orifices. This could provide extended life or use of plates, permit a more gradual adjustment of the flow diameter of the combined actual orifices used and will also tend to prevent the two plates from sticking together when the upper, sliding orifice sizes are larger, by maintaining or imposing the static pressure on top of the lower orifice plate. Also, a third plate similar to the above first plate and placed or located above the second plate to provide for clearing obstructions from these combined orifices by an occasional scissors-like action produced by rapid full-range sliding motions applied.

DESCRIPTION OF THE PREFERRED EMBODIMENTS AND METHODS

Figure 1:
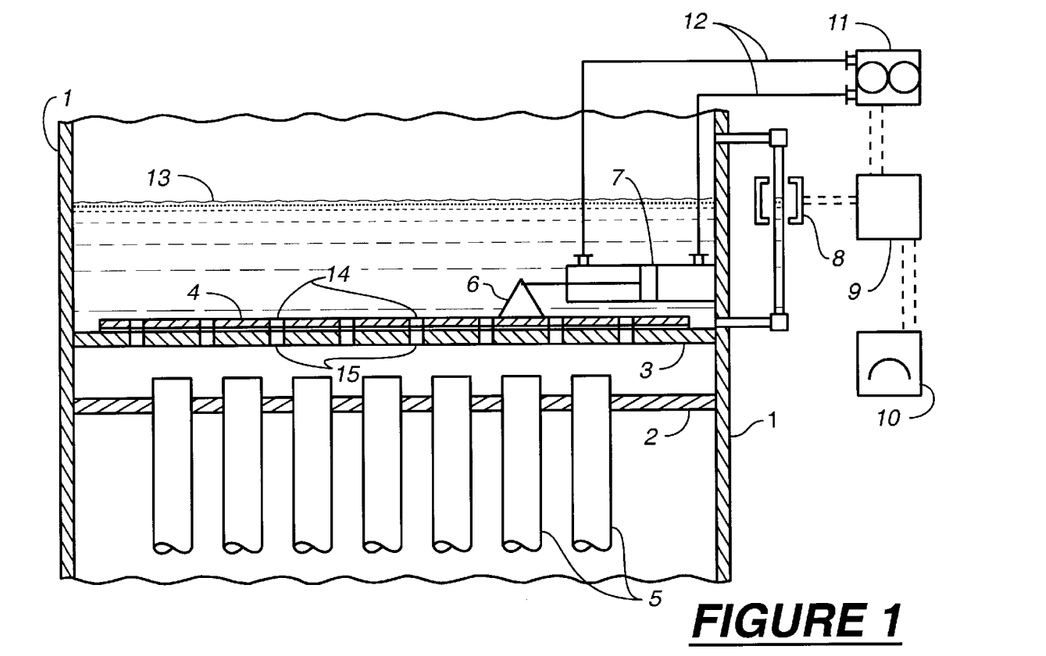
FIG. 1 represents a side view or an elevation view of dual orifice plates and an orifice-size adjustment mechanism.

FIG. 1 represents a side view or elevation view of the dual orifice plates and an orifice-size adjustment mechanism for the flashdown cooling of a liquid in a vertical channel bounded by the vessel walls 1 and wherein the tube sheet 2 and the tubes 5 shown do not apply and do not exist, and also for use in vertical tube evaporation for a downflow evaporator wherein the tube sheet 2 and the tubes 5 shown do apply and do exist; and representing parts of interface areas between effects in a vertical series.

Figure 2:
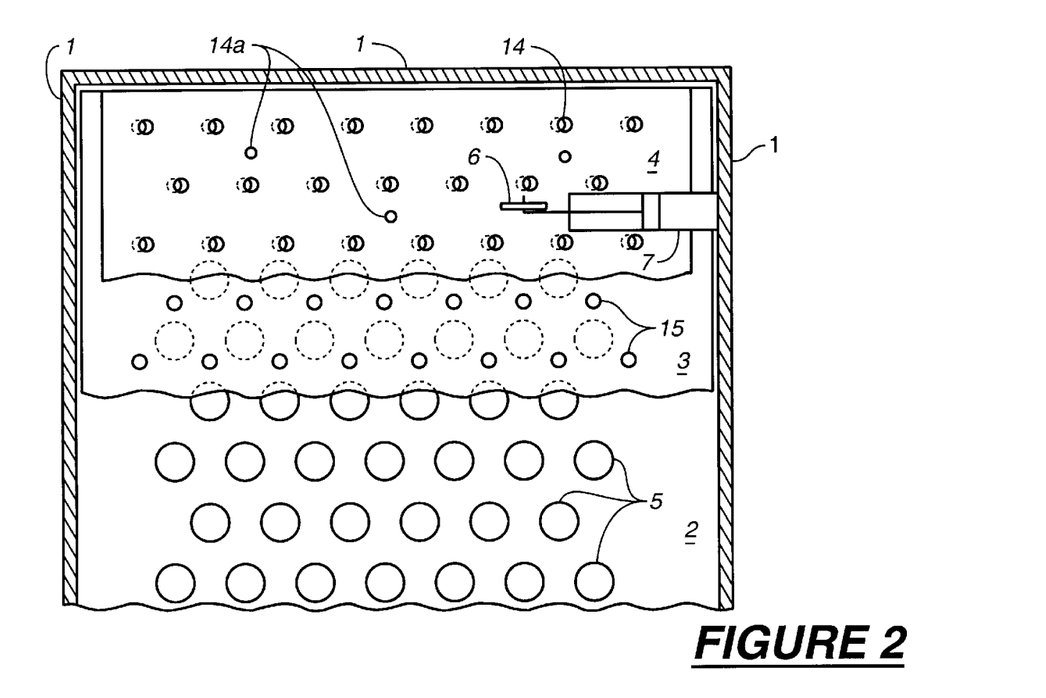
FIG. 2 represents a three-tier segmented plan view of dual orifice plates with evaporator tubes and a tube-sheet layout.

FIG. 2 represents a three-tier cut-away plan view with evaporator tubes and a tube-sheet layout as tier 2 and a second tier 3 section showing part of a fixed or lower orifice plate supported by the vertical walls or vessel sides 1, and a third tier 4 positioned there-above showing a part of the upper, slideable or translatable orifice plate 4 with orifices partially overlapping with the corresponding fixed-plate orifices. For one of the two process applications, i.e. distillate cool-down by flashdown thereof the first tier 2 comprising a tube sheet 2 and tubes 5 is not needed and does not apply or exist. The pair of orifice plates are then mounted across and above a flashdown zone leading into a single vertical flow channel for parallel flow of all the streams or jets from these orifices, as shown in the vertical product flashdown channels 27 in FIG. 3, shown under the orifice plates 41.

FIGS. 1 and 2 represent horizontally oriented arrays of adjustable orifices 14 and 15 through bi-layered or dual orifice plates 3 and 4 for flow control of downflow feed liquid streams into a flashdown evaporation zone therebelow having horizontal dimensions about the same as the orifice plates 3 and 4, and having either an open or free vertical channel below it bounded by vertical vessel walls 1 for cascading downflow of generally parallel streams of evaporating liquids for cooling-down thereof from all the orifices 14 and 15, and for collecting the residual liquid there-after into a pool thereof to serve as feed liquid for the next effect; and alternatively having an evaporator tube bundle as shown and comprising a multiplicity of vertical tubes 5 sealed into an upper tube sheet 2 which is sealed to the vessel walls 1 and located in the vertical channel bounded by the walls 1 of the vessel below the plates 3 and 4 supported on the walls 1 as shown for the distribution of vapor and liquid feed streams into the multiplicity of downflow evaporator tubes 5 for further evaporation while heated by vapor or steam condensed on the outside surfaces of the tubes 5 shown only in part and representing a tube bundle used for vertical tube evaporation (VTE), vertical tube foam evaporation (VTFE) or dispersed seeded slurry evaporation (DSSE). These orifice plates 3 and 4 are typically located at the pressure interface between two evaporator effects, and a feed liquid cascades from an effect there above into the pool of liquid 13 shown. The effect-to-effect pressure drop is imposed upon the liquid pool 13 and causes the feed to flow from the pool of liquid 13 from one effect into the next effect during downflow distribution of the feed liquid. As also shown, support for the feed liquid pool 13 is provided by the dual orifice plates 3 and 4 supported by the vessel walls 1, and the liquid level 13 is sufficient to provide for continuous liquid flow through the orifices 14 and 15 through the plates 3 and 4. The feed flowrate through these orifices respond to the pressure difference at the orifices which is due to the preceding effect being at a higher temperature and pressure than the next effect plus the static pressure due to the liquid in the pool having a level 13 above these orifice plates 3 and 4; and the rate of feed flow also depends on the orifice cross sections or flow apertures formed by a sliding translation of orifices 14 and 15 over one another. Each orifice cross section or flow aperture is adjusted by applying aperture control means which responds to a process signal or which relates to the level 13 of the liquid above the orifice plates 3 and 4 as sensed or measured, or to the pressure difference between the two effects as measured by the pressure on top of the plates 3 and 4, and whereby this sliding adjustment of the apertures of the orifices 14 and 15 controls both the feed level and the feed flowrate through the orifice plates 3 and 4. One example of such orifice plates, shown in FIGS. 1 and 2, is a two-layered plate 3 and 4 or two plates corresponding approximately in dimensions except that one plate may be much thinner than the other and may be made of a different material, and wherein the orifices are positioned to coincide across the pair of plates as shown or in any suitable distribution pattern. One of these plates, usually the thicker plate or primary orifice plate 3 is supported on the vessel wall 1 and may support plate 4 and the liquid pool. Upon passage through the orifices 14 and 15 to a lower temperature and pressure the liquid flashes down into vapor and a liquid at lower temperature. If the liquid 13 in the pool represents distillate to be cooled down by such flashdown distribution into the zone below the orifice plates 3 and 4, it then streams into the open vertical channel between the vessel walls 1 and the structures comprising tube sheet 2 and tubes 5 do then not exist, and the cooled liquid cascades down toward and into the liquid pool of feed for the next effect. Alternatively, and if the liquid in the pool 13 represents brine or a liquid to be further evaporated after flashdown distribution through the orifices 14 and 15 into the zone below them the vapor and cooled-down liquid then passes through this zone and into a vertical tube evaporator bundle. The fixed orifice plate 3 is then preferably spaced from, or variably spaced from the tube sheet 2 supporting the inlet ends of the evaporation tubes 5, and the residual liquid streams impinge onto the tube sheet 2 at locations between the upper ends of the tubes 5 which impingement causes foamy vapor-liquid layers to overflow into the tubes 5 to initiate foamy two-phase vapor-liquid flow as annular layers downward over the inside walls of the tubes 5 to enhance the efficiency of this further evaporation process. The tubes 5 may extend above the tube sheet 2 as shown or may be flush with the upper surface of the tube sheet 5. The second orifice plate 4 or slideable plate is caused to translate, slide or move laterally with respect to the first plate 3 to thereby reduce or control the flow apertures of the primary plate orifices 15 and to reduce or control the rates of feed liquid flow through the orifices. The means for sliding or translating one orifice plate with respect to another and for adjusting the flow aperture of the orifices may be any suitable drive mechanism such as any reversible lever handle, hydraulic or pneumatic or electric powered driver or motor 11 that responds to any suitable liquid level sensor such as a buoyancy sensor, or an optical sensor 8 that senses the actual liquid level 13 or to any flow sensor that monitors the flowrate of fluids through the orifices, or to a pressure sensor for the liquid layer above the orifices as well as the vapor pressure above it, or to a liquid salinity sensor or to a signal derived from any or all of these or other process sensors combined or adjusted or selected.

FIG. 1 also represents an elevation of the feed inlet area of a vertical tube evaporator (VTE) with the dual orifice plate for flow diameter control and any drive means, and FIG. 2 shows a plan view section corresponding to FIG. 1. Both FIGS. 1 and 2 show or represent only parts of an evaporator bundle feed inlet end, supports, steam jackets and vessel shrouds or vessel walls 1, and the upper tube sheet 2 supporting the VTE tubes 5 and attached to inner vessel partitions or shrouds or vessel wall surfaces 1, and a fixed orifice plate with maximal flow orifices through a plate 3 supported on the shrouds or walls 1 and spaced above the tube sheet 2, and a horizontally movable or slideably mounted or translatable orifice plate or other flow aperture control means 4 supported on top of the lower plate 3. A multiplicity of vertical evaporator tubes 5 passing through and welded or sealed to the upper tube sheet 2 shown represent a VTE tube bundle inlet end. Attached to the movable or slideable upper orifice plate 4 is shown a triangular plate 6 to which may be attached a translating or driving shaft from the piston of a hydraulic cylinder 7 mounted to the bundle support or vessel shroud or wall 1 or to the fixed orifice plate 3, and whereby the upper orifice plate 4 may be moved horizontally back and forth to translate this plate 4 with reference to the fixed orifice plate 3 to thereby change the flow apertures through this two-layered orifice plate comprised of adjacent plates 3 and 4. Maximum feed flow is obtained when the orifices 14 through the movable plate 4 imposes no restriction on the full flow or maximal flow apertures of the orifices 15 through the fixed plate 3, and minimal feed flow is imposed when the movable plate 4 slides towards the left or the right of its center position shown in FIG. 1 by a distance approaching half its orifice diameter. At or beyond this point the flow diameter is zero and the lower plate orifices are closed or covered. FIG. 1 shows maximal flow aperture orifices, and FIG. 2 shows reduced flow aperture orifices. However, the secondary orifices 14 may be of the same size or of different size, and preferably of larger size than the primary orifices 15, to direct liquid or static pressures upon the primary plate 3, and may they be of the same shape as the primary orifices 15 or of a different shape. To facilitate the moving or sliding of orifice plates, a thin film or layer or sheet of slippery or lubricating material, e.g., a Teflon sheet may be fused or applied to one or both plate surfaces in contact; alternatively a few small holes 14a (shown in FIG. 2) may be drilled through the upper orifice plate to apply feed liquid pressure to the upper surface of the lower plate and to prevent the plates from sticking together, and to provide for a liquid layer or liquid film between the plates to facilitate their sliding movement. A liquid level or an evaporator feed level sensor or detector 8 is shown in FIG. 1, located close to or mounted on a liquid level gauge or glass tube located inside or outside this vessel, or any other device to sense or detect or measure the level of the liquid corresponding to the liquid level 13 above the orifice plate assembly 3 and 4. This level sensor 8 may be any of a variety of suitable liquid level sensors including a float or a floating type, an electrical induction sensor or pick-up unit as represented herein and including magnetic or optical level sensors. Alternatively the liquid level above the orifice plates may be measured or sensed inside the evaporator vessel by a float, an enclosed mercury float switch, or another buoyancy device or any other device to sense the liquid level, or a pressure sensor (e.g. a piezo-electric sensor) may be employed located just above the orifice plates, or both such a vapor pressure sensor located above the liquid level and a second pressure sensor located in the liquid just above the orifice plates for detecting the combined hydrostatic and vapor pressures or only the liquid pool pressure exerted upon the orifice plates 3 and 4, and to use both data for orifice control.

The indicated or measured liquid level above the orifice plates may be transmitted to a level controller which may be one of several suitable types including an electrical oscillator 9 or a suitable microprocessor or computer to convert the level sensed by the detector 8 into an analog signal displayed on a dial type indicator 10 or any other visual indicator, and to convert it into a digital signal to be recorded by a printer or stored e.g., on a magnetic data storage device or computer diskette. In addition, the level signal may be transmitted to a hydraulic compressor 11 or to an electric motor or to a valve and to supply hydraulic fluid to move the piston in the cylinder 7 either to the left or the right from its wide open orifice position shown in FIG. 1 with hydraulic fluid through lines 12 to thereby adjust the flow apertures formed through the dual orifice plates 3 and 4 and to adjust and control the liquid level 13 responsive to the liquid level signal, and to maintain the liquid level 13 in the pool at any selected level or within a range of selected liquid levels. Alternatively, any other suitable level sensor or pressure sensor to detect the liquid level and any suitable driver to move the dual orifice plates relative to one another, and to adjust the orifice sizes or flow apertures may be utilized to adjust the rate of flow and to control the liquid level or the pressure above the dual orifice plates either directly or remotely by the facility operator or automatically from the facility control system. This liquid level control system also provides for high level and low liquid level alarm signals, and for control of the degree of liquid or brine concentration within a required range or balance throughout the multiple effect series of evaporators by, for instance, increasing or decreasing the liquid feed flow or the steam flow into the first effect, or by adjusting the coolant flow rate and the heat rejection rate from the lowest or last evaporator effect.

FIG. 2 represents a plan view of the feed inlet end of a downflow evaporator. The tube bundle shroud or the vessel wall 1 supports the upper tube sheet 2 through which the evaporation tubes 5 are mounted and the fixed orifice plate 3 which shows orifices 15 positioned to deliver the feed at three places adjacent to each tube inlet end. Locations for three additional similar but staggered orifices per tube are available if needed. The movable orifice plate 4 may be mounted on the fixed orifice plate 3 to slide over it for the purpose of adjusting the flow dimension of the combined orifices 14 and 15 by varying the degree of overlap of these two sets of corresponding orifices or openings in these two plates 3 and 4. Additional small holes 14a may be provided through the top plate 4 only as shown, to direct the inter-effect pressure mainly onto the primary plate and for preventing the pairs of plates from sticking together, or to ease their sliding translation by providing liquid flow into the small space between these plates, and to transmit static pressure onto the lower plate. In some applications this sliding translation may be applied by hand with levers or a crank or by levers as a direct mechanical drive converting the up and down motion of a liquid level float into the horizontal sliding plate action. These dual orifice plates 3 and 4 for liquid flow control are also useful for the purposes of controlling flash evaporation or flashdown of a warm liquid to a lower temperature with partial evaporation thereof, and for the cooling of such liquid. For such purposes, further disclosed in the specification with reference to FIGS. 3 and 4, the tube sheet 2 and the tubes 5 shown in FIGS. 1 and 2 are then replaced by an open vertical channel for cascading downflow of a liquid into a pool of feed liquid flowing into the next effect.

FIG. 3 represents a simplified process flow diagram for a vertically stacked multi-effect downflow evaporation (ME-VTE) facility for seawater conversion including its condenser 17, feed heater 20, a stack of several VTE effects having dual adjustable orifice plates 31, and vertical distillate flashdown channels 27 for product cooling by flashdown through dual adjustable orifice plates 41 for downflow in a vertical channel 27 series.

Figure 4:
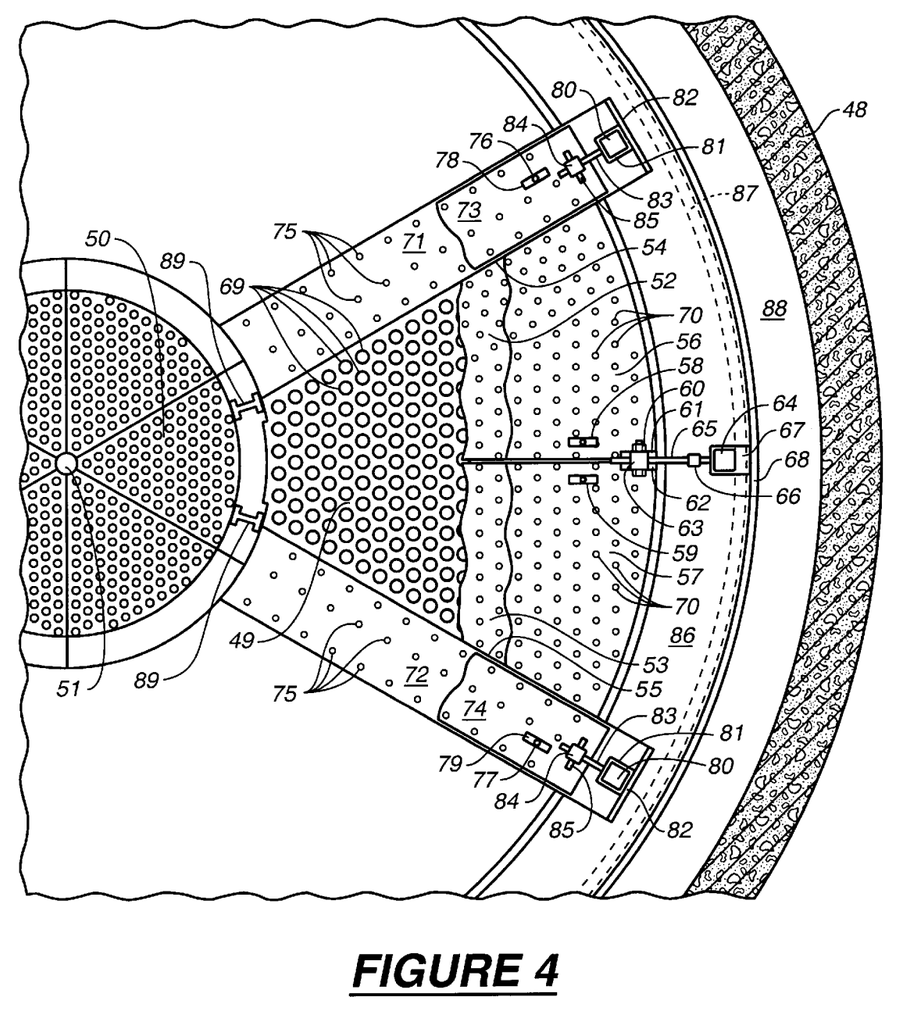
FIG. 4 is a plan view.
Figure 5:
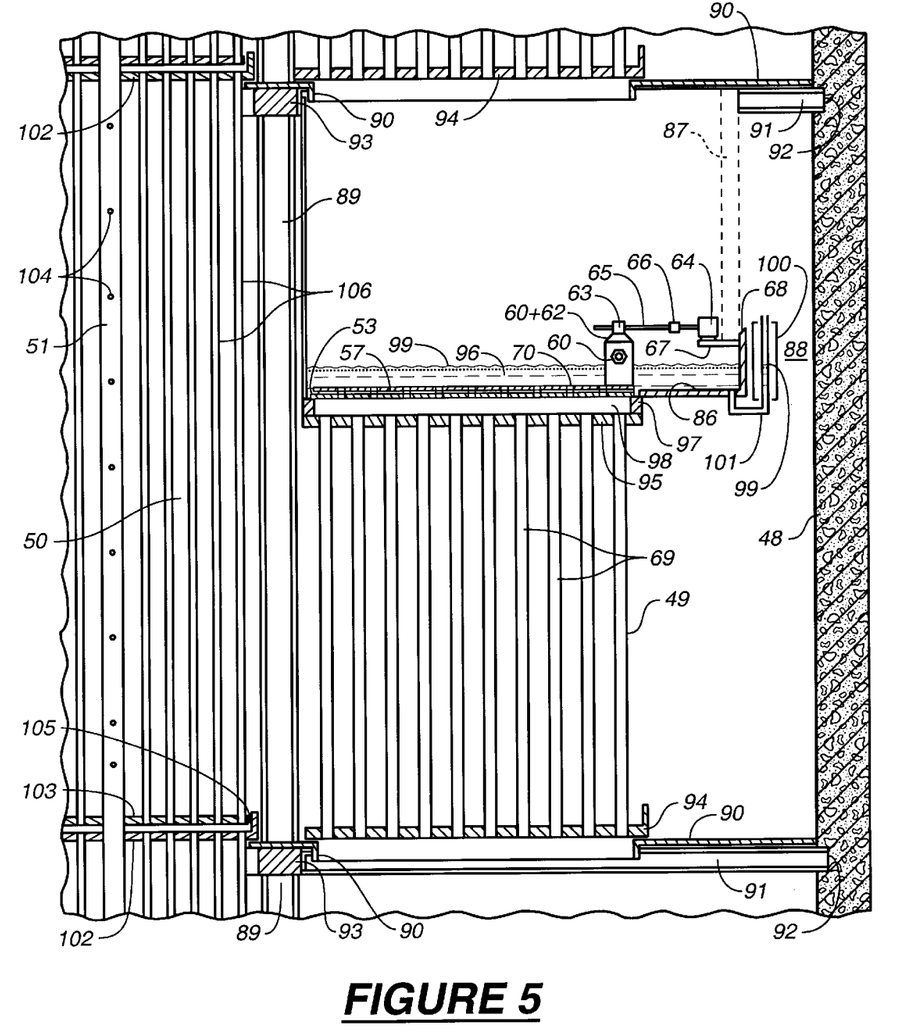
FIG. 5 is an elevation view representing segments of vertical-tube evaporator tube bundles which are pie shaped or triangular, with adjustable dual orifice plate segments.

FIG. 3 represents a simplified flow diagram of a multi-effect stacked downflow vertical tube evaporation (ME-VTE) facility for seawater evaporation which may have up to about thirty-five such effects and a condenser, feed heaters and distillate flashdown coolers, all of which may be contained in a vertical cylindrical vessel such as a concrete silo, shown in part only in FIGS. 4 and 5, or in another suitable vessel of another suitable material or another support structure. Seawater to be or distilled is to be pretreated by addition of sulfuric acid to adjust its pH to about 6 followed by its decarbonation and deaeration; these implied steps are not shown in FIG. 3. seawater is pumped as coolant 16 into this facility and absorbs the rejected heat as it passes through a heat reject condenser 17, and the warmed coolant may then be split into a rejected coolant stream 18 and an evaporator feed stream 19 which is then pretreated and pumped upward through a vertical feed heater 20 and into the top of the multi-effect stack of VTE effects 21, 22, 23, etc. Only six such effects are shown, representing up to about thirty-five or any other selected number of effects in a series which includes the first three effects in the series 21, 22 and 23, and the last or lowest three effects 24, 25 and 26 shown at the cold or bottom end of this series of VTE effects. A series of vertical product flash channels 27 for the cooling down of distillates by progressive flashdown cooling through up to about thirty-three stages or effects or any selected number to reach the final cooled distillate product 28 and to combine the condensate 45 from the condenser 17 as the distillate product. The preheated seawater feed 29 pumped upward through the preheater 20 (also shown as item 50 in FIG. 4) is divided and distributed into the several first effect level 21 feed distribution areas of which one only is shown in FIG. 3 (three such pie-shaped areas are shown in FIG. 4, three more are implied), and wherein the pressure on the feed 29 is reduced to cause venting of some vapor and the non-condensable gas released to the air as a vent at 30. The deaerated feed would cover all the first effect 21 orifice plates as the feed distribution assemblies for each effect level of which only one is shown 31 (six such pie-shaped orifice plated areas are implied in FIG. 4 but only one is shown as segmented dual orifice plates 52–53 and 56–57). These orifice plate assemblies 31 control the VTE feed level and the feed flowrate into the effect evaporator tubes 38 (or into tube bundle 49 of FIGS. 4 and 5); such orifice assemblies are also represented in more detail in FIGS. 1, 2, 4, and 5. Heating steam 32 for evaporation is applied from a boiler or from a power plant turbine as extraction steam at a suitable pressure, and into the shell-sides of the tube bundles 33 of the first effect level 21 whereof only a few tubes 38 representing one bundle of tubes 33 are shown, to partially condense the steam 32 on the outside walls of the tubes 38 and to cause the seawater brine flowing downward as annular layers over the tube 38 inside wall surfaces to partially evaporate and produce vapor flow 36 into the shell-side of the next effect bundle 22 below it. A portion 34 of the steam 32 remaining uncondensed is vented through the first effect tube bundles 33 and into the shell-side of a top section of the vertical feed heater tube bundle 20 where it is further condensed except for a small fraction which may be vented at 35 with non-condensable gases present. The hot condensates 37 from the heating steam 32 and 34 are to be collected and returned to the boiler or power plant for reuse. Residual brine flowing through the first effect 21 tubes 38 falls into a basin or pool above the second effect 22 orifice plate assembly 31 while the vapor generated from it flows out sideways 36 and then down into the shell-side of the second effect 22 tube bundles, and so on down the series of vertically stacked effects. All condensate flows 39 from the shell-sides of these effects and the feed heater bundles below the first effect 21 level are diverted into the distillate product flashdown channels 27 to recover heat in the form of warm flashdown vapors 40 diverted into the effect tube bundles for condensation and for the further evaporation of brine, and such flashdown also serves to cool these distillates progressively in stages parallel with the series of effects. Pool levels and flashdown flowrates of the warm distillates for cooling-down thereof are controlled by also using dual adjustable orifice plates 41 shown, similar to those disclosed herein for feed brine flow and level control 31, and also represented and discussed with reference to FIGS. 1, 2 and 4. Residual, concentrated brine falling from the VTE tubes 38 of the lowest effect 26 collects in its basin and is pumped out as cooled blowdown 42 for return to the ocean and it may be mixed into the power plant coolant return flow. The vapor 43 produced in this final effect as well as the final vapor 44 produced in the flashdown channel 27 are condensed in the heat reject condenser 17 maintained under vacuum, and this product 45 is combined with the cooled distillate product 28 of the ME-VTE facility represented by this process flow diagram.

Pretreatment of the VTE feed 19 depends on the feed chemistry. For seawater feed and brines causing scaling/fouling problems, pretreatment is by acid addition to adjust it to a pH of about 6 followed by removal of carbon dioxide and other gases. Addition of the monomolecular dispersant of copending patent application, Ser. No. 07/817,187 now U.S. Pat. No. 5,156,706 which may be dosed at 46, can control scaling and fouling.

FIG. 4 is a plan view and FIG. 5 is an elevation view representing segments of vertical tube evaporator (VTE) tube bundles 49 which are pie shaped or triangular, with adjustable dual orifice plate segments 52 & 53 and 56 & 57 for a pie section of an annular cylindrical shaped multi-effect stack of evaporator tube bundles 49 around a central feed heater tube bundle 50 comprised of pie shaped segments within the annular circle of VTE bundles 49, and adjustable orifice plate pairs 71 & 73 and 72 & 74 covering vertical product flashdown channels, all representing one effect level of a multi-effect (ME) series of vertically stacked effects comprising annular VTE units and product flashdown channels around central feed heaters, and all inside the concrete silo or vessel wall 48 or a cylindrical vertical silo type evaporator facility for seawater desalination.

FIGS. 4 and 5 represent two preferred orifice plate arrangements, one for VTE feed control and another for product flashdown control, and also preferred process and apparatus options for a single evaporator effect unit at an intermediate effect level in a multi-effect stacked series of evaporators such as effect levels 22 to 25 in process flow diagram of FIG. 3.

FIG. 4 represents a simplified plan view of one of a multiplicity of generally triangular or pie-shaped vertical evaporator tube bundles 49 in an annular array around central feed heater tube bundles 50, as part of one effect shown in horizontal section or plan view; and it also shows the dual or split orifice plates for VTE liquid flow and level control and for product flashdown flow control of this disclosure when applied to a vertically stacked effect series in a cylindrical silo vessel to contain or support the ME-VTE downflow facility of an intermediate capacity or about 5 to 10 million gallons per day for seawater conversion. For larger facilities, several such cylindrical or hexagonal shaped annular VTE bundles around feed heater bundles may be mounted side-by-side within a larger silo vessel and in hexagonal array as discussed below.

FIG. 5 represents a vertical section or elevation view of the evaporator unit of FIG. 4, with the orifice plate assembly above the VTE bundle, and of the feed heater tube bundle for one effect level and partially for adjacent effect levels.

In FIG. 4, part of a vertical concrete wall 48 of a cylindrical silo vessel is shown which may provide support for a vertical stack of a multi effect series of pie-shaped evaporator bundles whereof only one VTE bundle 49 is shown in part, and also shown is a vertical feed heater tube bundle segment 50 representing three of the six pie-shaped sections of such a continuous, central long-tube feed heater assembly which would serve as the feed heater for the ME stack of annular VTE bundles around it; this is shown in FIG. 3 as item 20. A common vent tube 51 for the central feed heater assembly is shown at the center of the cylindrical evaporator facility represented here; this was also represented in FIG. 3 but as vent lines ending in two vent points at 35. Two segments, 52 and 53 of the first or lower orifice plate of this disclosure as preferred for this application are shown mounted above the VTE tube bundle 49, and its preferred mounting level is spaced about one to two inches above the VTE tube inlet ends but may selectively vary between about a quarter inch and six inches, and one mounting procedure is by hinging this first orifice plate along its outside edges 54 and 55. The object of hinged mounting is to permit the orifice plates to be lifted up or raised on edge to permit occasional inspection of the tube inlet ends and for hydro-cleaning of the tubes when needed. These orifice plates may be subdivided into two or more segments for separate hinging or to facilitate their removal as needed. However, larger orifice plates would be more economical and would also reduce the number of orifice control devices. The second orifice plate or the adjusting plate or orifice control device of this specification is slideably mounted on the first orifice plate and is again shown in two segments 56 and 57; and the parallel sliding in unison of these two plates over the first pair of plates is preferred, which is provided for by securing them slideably through two pairs of elongated slots of which only one of each pair, i.e. 58 and 59 are shown, by using studs or pins through these slots attached to the lower plates as indicated or by another slideable mounting means which provides for easy sliding or translation of these parallel plates in close proximity to the first pair of plates and in line with their orifice patterns. The sliding motion of the second or upper pair of orifice plate segments may occur in unison by securing them to one another, e.g., with a bolt 60 through two vertical plates 61 and 62 which are attached one each to the upper orifice plates, e.g., by welding, and one of the vertical plates having for instance a threaded nut 63 welded thereto to move this plate horizontally back and forth on either side of the central position of the sliding movement by means of a motor 64 which may be a reversible hydraulic, pneumatic or electric motor or any other suitable driver which will provide rotation of the threaded shaft 65, or any other suitable orifice plate sliding means, and responsive to any liquid level controller which senses the level or static pressure of the liquid layer above the orifice plates and is set to control this level at a desired level or between selected high and low levels, as shown in FIGS. 1 and 5. The threaded shaft 65 shown is connected to the shaft of the motor 64 through a coupling 66 to permit easy shaft disconnection to inspect the VTE tube inlet ends by tilting the segmented orifice plate assemblies upward when needed. The motor 64 may be mounted as shown on a plate 67 welded close to the top edge of the feed liquid containment outer wall 68 as also shown in FIG. 5. The pattern and spacing of the orifices depend on the VTE tube diameters and spacing. In the typical triangular pattern represented at 69 the tubes are usually spaced apart about a half an inch for two-inch diameter tubes. The preferred feed distribution patterns are on to the top tube sheet at six or three positions around each tube, and equally spaced between tubes. The orifice pattern and spacing shown 70 on the plates 52, 53, 56 and 57 are three around each tube position for simplicity rather than preference, and these flow orifices as shown are in the wide-open or overlapping position. The primary orifice sizes, i.e. as drilled or punched through the plates, and the plate materials used or selected depend on the process needs they are designed for.

The adjustable orifice plates of this disclosure are also used to control liquid levels and flows for the product flashdown channels from effect to effect, as also indicated in FIG. 3 as item 41, and as discussed above in reference to FIGS. 1 and 2. Two such sets of liquid level controllers are shown in FIG. 4, one on each side of the VTE tube bundle 49, and each controls the distribution of condensates or distillates produced on the shell-sides of this tube bundle 49 and on the feed heater tube bundle 50 by the condensation of steam or vapor on their outer tube wall surfaces, as well as condensates flashed down from earlier similar effects higher up in a ME series. These dual orifice plate assemblies for product level and product flashdown control may be located at levels below the lower tube sheets of tube bundles 49 and 50 to provide for drainage of condensates from these lower tube sheets onto the orifice plates, and to permit a suitable level of condensate product pools to be supported in open canals or gutters supported above the dual orifice plates and automatically controlled by the process and means of this invention. These orifice plate assemblies for product flashdown are shown as fixed or stationary plates 71 and 72, and slideably mounted plates 73 and 74; each stationary plate has a set of orifices 75 sufficient in total or cumulative flow diameters to pass the maximum flow of condensates to be anticipated at its location in the ME series at any time and condition of evaporator operation and to control the level above these plates between selected liquid levels. The slideable orifice plates 73 and 74 have the same orifice pattern as the fixed plates, and orifices of the same or a larger flow diameter and may be of a different shape, e.g., an oval orifice shape. The sliding plates 73 and 74 are maintained in alignment with the stationary plates 71 and 72 by two pairs of bolts, pins or studs such as 76 and 77 which pass through rectangular slots such as 78 and 79 and are secured into the lower plates, and are located near each end of these plate assemblies but only one of each pair is shown. The sliding movement of the secondary plates 73 and 74 may be driven by any suitable reversible motor including electrical or pneumatic or hydraulic driven motors or other suitable mechanisms. Hydraulic motors 80 mounted on support plates 81 welded to the walls of the flash channels 82 and driving threaded rods 83 through threaded nuts 84 attached to vertical plate supports 85 welded to the sliding plates 73 and 74 may be used to adjust the orifice flow diameters for both of the product flash channels shown, and are responsive to liquid level signals from suitable liquid level or pressure detectors to adjust the orifice flow-through sizes and to maintain selected liquid or condensate levels in pools thereof above each of these orifice plate assemblies during all phases of VTE facility operation. The product distillates would thus cascade downward effect-to-effect through a series of such orifice plate pairs at the effect interfaces to cool down the accumulated distillate products while releasing heat for reuse.

The curved flat plate area 86 forms the bottom of the feed liquid pool or pan, bounded by its outer wall 68. Suspended as a curved curtain and hanging down to just inside this wall 68, is the mist elimination screen 87 made of knitted wire mesh usually about six inches thick, and is also shown in FIG. 5. The open, curved area 88 provides a passage or gap between the silo wall 48 and the vertical wall of the pan 68 for vapor flow downward into the next effect VTE tube bundle steam side as also shown in FIG. 3 by arrow 36. This curved area or gap 88 shown is circular and annular, continuous around the entire assembly of tube bundle 49 units of each effect. The approximate position of two vertical I-beam supports 89 are shown between the VTE and feed heater tube bundles; these I-beam supports are also shown in elevation in FIG. 5 as item 89.

FIG. 5 represents a vertical section view of intermediate VTE effects similar to the effects numbered 22, 24 and 25 in FIG. 3 of the stacked ME-VTE facility, and is comparable to the VTE effect plan view of FIG. 4. The vertical wall of a concrete silo type of vessel 48 supports the effect floors 90 on horizontal I-beams 91 inserted into ledges 92 cast into the concrete wall 48. Alternatively, these outer ends of the floor supporting I-beams 91 may be supported at their outer ends on vertical I-beams similar to the I-beams 89 shown supporting the inner ends of the floor-supporting I-beams 91 welded or bolted to a metal ring member 93 which supports the feed heater and VTE tube bundles. In this alternative, the outer circle of vertical I-beams supporting the radial connecting floor-supporting I-beams 91 may be welded or bolted to a second series of outer edge floor supporting I-beams connecting their top ends to complete the main support frames for each VTE effect of the stack of such effects; the silo vessel then is mainly a pressure or vacuum vessel The VTE tube bundles 49 are comprised of a multiplicity of evaporator tubes 69 supported by a lower tube sheet 94 resting on and sealed to an effect floor 90 along its lower edges, and an upper tube sheet 95 supporting the adjustable orifice plate assembly of this invention and a pool of VTE feed liquid 96 above it. The orifice plate assembly is comprised of a lower or primary orifice plate 53 which may be hinged along its far side, and is supported by a spacer 97 which provides and surrounds a variable gap 98 about one to two inches high between the top tube sheet 95 and the lower orifice plate 53, and an upper or secondary orifice plate 57 slideably mounted on the lower plate 53 and having orifices 70 corresponding through both plates. The upper orifice plate 57 can be translated, moved or slid to the left and to the right of its center position shown by means comprising an attached vertical plate 61 (and 62) having a threaded nut 63 attached to its top and a threaded shaft 65 passing through the nut 63, and the shaft being driven by a reversible motor 64 mounted on a plate 67 attached to the feed liquid containment wall 68 at a level above the feed liquid level 99. A nut and bolt 60 may secure to one another the vertical plates 61 and 62 welded to two adjacent sliding or upper orifice plate segments; these segments would then slide in unison.

The feed liquid level 99 of the feed liquid pool 96 may be monitored by any suitable means for example by a level sensor 100 which senses the liquid level 99 inside a liquid level sight tube 101, e.g., with or by a magnetic float level sensor or an optical sensor or any other suitable level sensor and to provide a liquid level signal to activate the motor 64 and to move or slide the upper orifice plate 57 to adjust the flow diameter or flow area of all the orifices 70 and to maintain the liquid level at or close to a selected or preset level, or between two selected levels by regulation or control of the liquid flowrate through the dual orifice plates. In addition, the liquid level signal may be transmitted to a central computer or control station for recording and/or display or manipulation or adjustment thereof and to correlate and adjust all effect liquid levels at all times during operation of the VTE facility, and to thereby improve the process control aspects including the enhancement of the distillate productivity rates in all effects and to improve the continuous availability and the dependability of the ME-VTE online productivity. For instance, if the feed level in an effect becomes unusually high this central control facility may automatically initiate an orifice self-cleaning by causing the slideable orifice plates to reciprocate or alternate or move rapidly between their opposite terminals or limits of sliding to remove or dislodge or sever or cut any orifice obstructions, foulants or seaweed, and to permit fragments to pass through.

In FIG. 5 a vertical mist elimination screen 87 is shown for capturing small drops of liquid entrained within the vapor flow generated during evaporation and for returning this liquid to the liquid pool 96. Vapor flows from the area above the pool 96 through the screen 87 and downward into the tube bundle 69 of the next effect, as also shown in FIG. 3 by arrows 36, and condenses on the outside walls of these tubes 69 to evaporate more of the liquid which, after passing through the orifices 70, is at a lower pressure and temperature than the condensing vapor.

Also shown in FIG. 5 is a feed heater tube bundle section 50 including an upper tube sheet 102 and a lower tube sheet 103, with feed heater tubes 106 terminating therein and sealed thereto and a central vent tube segment 51 which is part of a vent system including such effect venting tubes 51 in each feed heater bundle 50 for withdrawal of vented gases and some vapor from all effects in any suitable venting mode and into a suitable vent condenser and vacuum pump. The upper tube sheet 102 may support the tube bundle segment 50 by having its edges resting on and sealed to the effect floor 90. The vent tube 51 may have small holes 104 of selected sizes and at selected locations drilled through its wall to provide adequate rates of effect venting. These vent tubes 51 may alternatively terminate in the tube sheets and be sealed thereto, e.g., by welding or rolling, and may then also be sealed to the next segment vent tubes by short tubular inserts which are not shown, and having 0-rings to seal these inserts to the inner wall surfaces of adjacent vent tube segments and to provide a continuous vent channel through several effects in series. The lower tube sheet 103 may be sealed to the upper tube sheet 102 of the next effect below it with a sliding or floating O-ring seal shown at location 105 to accommodate differential thermal expansion of the feed heater tubes 106 with reference to the effect support structures. This seal at 105 would be under a substantial pumped feed pressure and is critical; a double 0-ring seal is suggested at 105. Differential thermal expansion between the VTE tube bundles and the vessel walls may be accommodated by simple sliding seals or loop seals where needed.

Such a VTE bundle stack composed of six annular pie-shaped VTE bundles surrounding a central vertical feed heater bundle as an effect unit represented in FIGS. 4 and 5 may be suitable for up to about five million gallons per day (1 MGD) of seawater distillate production. For evaporator facilities of larger capacities, say about 10 to 100 million gallons per day, several such multi-effect stacks of VTE units comprising bundles of central feed heater tubes surrounded by evaporator tube bundles in annular array could be located or nested side-by-side, e.g., hexagonally nested effect bundles stacked as multi-effect units forming a honeycomb-like assemblies of effects at each level of a multi-effect stacked series, and having a continuous effect-level steam or vapor space around these bundles for each effect level. These spaces between hexagonal arrays would also provide space for condensate ditches or canals around these bundles at the effect floor levels to collect all effect condensates, and space for personnel access. It would be preferable for such larger facilities to combine the product flash channels for distillate cooling, and to divert all products from several evaporator units at each level into a single and larger vertical flashdown channel, e.g., the distillate products from three to ten adjacent evaporator units would be combined into a single large vertical channel having a much larger dual orifice plate for flashdown control effect-to-effect, as also indicated in FIG. 3 as item 27. Considering that about two-thirds of the feed becomes distillate, these flashdown channels must cool down large distillate volumes which increase at each effect level. These channels may be located in one or several hexagonal or triangular vertical shafts divided or segmented by dual orifice plates for distillate flashdown at each effect floor level, and the shafts for this service being selected or located amongst evaporator unit stacks or in triangular spaces formed between the silo wall and those evaporator stacks. Also, in such large plants the annular VTE effect bundles would then be continuous rather than pie-shaped or segmented as is FIG. 4, and would preferably have an hexagonal outer edge to economize on space. And the dual orifice plates for these larger VTE bundles would then be larger, combining several segmented pie shapes shown herein to form large continuous dual orifice plates surrounding the feed heater bundle 50 and having a hexagonal outer edge of about the same lateral dimension as these large hexagonal VTE tube bundles and an inner circular edges around their central feed heater bundles. This would reduce both the orifice plate costs and the plate driver mechanisms needed. The drivers would be reduced from about six per VTE effect unit as implied in FIG. 4 (which shows driver components 60, 61, 62, 63, 64, 65, 66, and 67) to one single driver unit for the orifice adjustment of each such large dual orifice plate per effect bundle. Similar reductions in driver units would be achieved for the larger product flashdown channels formed between hexagonal VTE units; a single central hexagonal product cooling flashdown channel would serve at least about six hexagonal multi-effect evaporator stacks in such a large ME facility and replace the need for at least about 1000 U-trap flashdown units for a 30-effect facility. The process flow diagram of FIG. 3 would apply to any of these 5 MGD or 10 to 100 MGD capacity options elected.

This disclosure applies to any vertically oriented ME series of any suitable evaporator type including the VTE, VTFE, DSSE and HTE types earlier mentioned, and wherein each effect level unit comprises an evaporator unit similar to the unit represented in part by FIGS. 4 and 5, and also to multiples of such nested units located in side-by-side clusters within a vessel or silo, for instance three, seven, eighteen or more in clusters of circular or hexagonal units spaced in horizontal array at each effect level of the ME series as also shown in the MWD Preliminary Design Report No. 1084 at page 15, and wherein the entire ME series may be supported by vertical and horizontal I-beams or vertical cylindrical columns and horizontal I-beams supported from the floor upward and mounted within a vertical cylindrical silo or any other suitable pressure or vacuum vessel to enclose the vertical stacks of nested ME-VTE units for large facilities for regional water supply by seawater conversion.

The following is claimed:

1. In an effect-to-effect evaporation of a liquid a method for distribution of said liquid for downflow evaporation thereof from a pool of said liquid whereto more of said liquid is added, the improvement comprising:
   (a) forming a multiplicity of orifices in parallel array through a plate supporting said pool of liquid for said distribution of said liquid through said orifices,
   (b) determining the level of said liquid in said pool and
   (c) adjusting the flow diameters of said orifices responsive to said level of said liquid by sliding translation of an array of orifice adjusting means adjacent to said orifices,
   (d) and controlling the rate of flow of said liquid through said orifices and maintaining said liquid level in said pool at about a selected level above said plate and maintaining effect-to-effect pressure control causing flashdown of said liquid, wherein said control of said rate of flow of said liquid provides for a range of said flow reduced by about 50% below an effect design point flowrate and to about 400% above said design point flowrate while maintaining said liquid level in said pool within a range of about 3 inches to 9 inches above said plate.

2. The method of claim 1, wherein said multiplicity of orifices consists essentially of two arrays of corresponding parallel orifices adjacent to one another, and wherein said adjusting of said flow diameters of said orifices is provided by sliding one of said two arrays of orifices over the other of said two arrays of orifices.

3. The method of claim 1 wherein said liquid is water and wherein said flashdown cools said water to a lower temperature at a lower pressure when said water is distributed through said orifices.

4. The method of claim 1 wherein the effect-to-effect evaporation is applied in a vertical series of evaporation effects and wherein said liquid is distilled water produced at a temperature existing in a higher effect of said series and caused to fall into said pool for said distribution of said liquid through said orifices for flashdown of said liquid to a temperature lower than said temperature.

5. The method of claim 1 wherein said liquid is brine and wherein said flashdown cools said brine to a lower temperature at a lower pressure when said brine is distributed through said orifices.

6. In an effect-to-effect evaporation of a liquid a method for distribution of said liquid for downflow evaporation thereof from a pool of said liquid whereto more of said liquid is added, the improvement comprising:
   (a) forming a multiplicity of orifices in parallel array through a plate supporting said pool of liquid for said distribution of said liquid through said orifices i n to a multiplicity of vertical evaporation channels for partially evaporating said liquid,
   (b) determining the level of said liquid in said pool and
   (c) adjusting the flow diameters of said orifices responsive to said determined level of said liquid by translation of an array of orifice adjusting means adjacent to said orifices,
   (d) and controlling the rate of flow of said liquid through said orifices and maintaining said liquid level in said pool within a selected level range above said plate and maintaining effect-to-effect pressure control causing flashdown of said liquid, wherein said determining of said level of said liquid in said pool is measured in terms of the pressure of said liquid on said plate, and wherein said adjusting of said flow diameters of said orifices is further responsive to said measured pressure on said plate, and wherein said selected liquid level range of said pool is determined from said measured pressure of said liquid in said pool.

7. The method of claim 6, wherein said evaporation channels consist of a bundle of vertical evaporation tubes for partial evaporation of said liquid with heat transmitted from vapor condensed on the outside walls of said tubes and wherein said orifices are aligned to deliver said liquid into an inlet ends of said evaporation tubes after said flashdown of said liquid.

8. The method of claim 7 wherein said multiplicity of orifices are spaced (preferably) by about 1 inch to 2 inches from said inlet ends of said tubes and wherein said orifices are generally spaced by about ¼-inch to 6 inches from said inlet ends.

9. The method of claim 7 wherein said control of said rate of flow of said liquid provides flashdown of said liquid during distribution of said liquid into said tubes for foamy annular flow of said liquid through said tubes to improve the thermal efficiency of said evaporation.

10. The method as in claim 6, wherein said orifices consist of two arrays of corresponding parallel orifices slideably mounted adjacent to one another and wherein said adjusting of said flow diameters is provided by a sliding translation of one of said two arrays over the other of said two arrays.

11. The method of claim 10 wherein said distribution of said liquid is maintained by causing said two arrays of parallel orifices to be repetitively translated back and forth to dislodge debris obstructing said orifices therefrom.

12. The method of claim 6 wherein said evaporation of said liquid occurs in an effect representing one of a series of downflow evaporation effects and wherein (more of said) liquid is added to said pool from an evaporation effect above said effect in said series of downflow effects.

13. The method in claim 6 wherein said liquid consists of partially evaporated seawater flowing through a multi-effect series of stacked evaporators and wherein said control of said rate of flow of said liquid maintains said series of evaporators essentially free of precipitation of solutes from said seawater evaporated over an extended range of evaporation rates.

14. The method of claim 6, wherein said liquid consists of brine and wherein said control of said rate of flow of said liquid feed maintains non-saturation of a solute in said brine in each of a series of downflow evaporation effects.

15. The method of claim 6 wherein said control of said rate of flow of said liquid provides for flow of said liquid within about a 5-fold range of flowrates and said maintained level of said liquid in said pool is about 6 inches.

16. The method of claim 6 wherein said control of said rate of flow of said liquid distributed into said evaporation channels is used to control effect-to-effect flow (stability) instability (during said distribution of said liquid) and to improve the efficiency of said evaporation.

17. The method of claim 6 wherein said liquid is a brine and wherein a monomeric surfactant dispersant is added to said liquid to control precipitation of (a solute) scale during said evaporation of said liquid to improve on-line availability of said (method) evaporation.

18. The method of claim 6 wherein said liquid is seawater being desalinated by said evaporation and wherein said method reduces the overall height of said effect used for said effect-to-effect evaporation and the height of a vertical multi-effect facility for seawater desalination.

19. The method in claim 6 wherein said maintaining of said selected level range above said plate reduces the overall height of a facility for said effect-to-effect evaporation and the energy required to pump said liquid into said facility.

20. The method of claim 6 wherein said control of said rate of flow of said liquid is carried out with a programmable logic controller for said effect-to-effect evaporation using process data including data for said determining of said level of said liquid in said pool.

21. The method of claim 6 wherein said control of said rate of flow of said liquid maintains continuous feed flow into all said channels and prevents precipitation of solutes in said channels.

22. The method of claim 6 wherein said control of said liquid level in said pool provides for a reduction of said level in said pool and maintains continuous feed flow through all orifices of each effect during turned-down evaporator operation including start-up and shut-down phases of operating said evaporator.

23. The method of claim 6 wherein said evaporation is applied in a multi-effect series for partial evaporation of said liquid, and wherein said liquid is brine concentrated in salinity as it is cascaded from effect-to-effect.

24. The method of claim 6 wherein said liquid is seawater and the salinity of said seawater is measured in said pool, and wherein said rate of flow of said seawater is controlled to prevent said salinity from reaching the saturation limit of calcium sulfate dissolved in said seawater by reference to a known solubility limits for calcium sulfate in seawater concentrates at the temperatures of said effect-to-effect evaporation.

25. In a multi-effect evaporation of a liquid a method for distribution of said liquid for downflow evaporation thereof from a pool of said liquid whereto more of said liquid is added, the improvement comprising:

(a) forming a multiplicity of orifices in parallel array through a plate supporting said pool of liquid for said distribution of said liquid into a zone for flashdown of said liquid, (b) determining the level of said liquid in said pool by sensing the pressure of said liquid in said pool on said plate and (c) adjusting the flow diameters of said orifices responsive to said sensed pressure on said plate by translation of a horizontal array of orifice adjusting means adjacent to said orifices, (d) and controlling the rate of flow of said liquid distributed into said zone and maintaining said pressure of said liquid in said pool supported by said plate within a selected pressure range to maintain said flashdown of said liquid into said zone, wherein said multiplicity of orifices consists essentially of two arrays of corresponding parallel orifices adjacent to one another, and wherein said adjusting of said flow diameters of said orifices is provided by sliding one of said two arrays of orifices over the other of said two arrays of orifices.

* * * * *